United States Patent
Choi

(10) Patent No.: US 11,353,705 B2
(45) Date of Patent: Jun. 7, 2022

(54) GLASSES-TYPE DISPLAY APPARATUS

(71) Applicant: SAMSUNG ELECTRONICS CO., LTD., Suwon-si (KR)

(72) Inventor: Myongjo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/857,379

(22) Filed: Apr. 24, 2020

(65) Prior Publication Data

US 2020/0371357 A1   Nov. 26, 2020

Related U.S. Application Data

(60) Provisional application No. 62/850,814, filed on May 21, 2019.

(30) Foreign Application Priority Data

Dec. 13, 2019 (KR) .................. 10-2019-0167134

(51) Int. Cl.
*G02B 27/01* (2006.01)

(52) U.S. Cl.
CPC ..... *G02B 27/0172* (2013.01); *G02B 27/0176* (2013.01); *G02B 2027/0178* (2013.01)

(58) Field of Classification Search
CPC ............ G02B 27/0172; G02B 27/0176; G02B 2027/0178
See application file for complete search history.

(56) References Cited

U.S. PATENT DOCUMENTS

| | | | |
|---|---|---|---|
| 7,764,413 B2 | 7/2010 | Levola | |
| 8,123,352 B2 | 2/2012 | Matsumoto et al. | |
| 9,081,178 B2 | 7/2015 | Simmonds et al. | |
| 9,835,787 B2 | 12/2017 | Lee et al. | |
| 10,162,183 B2 | 12/2018 | Ide | |
| 2011/0227813 A1 | 9/2011 | Haddick et al. | |
| 2015/0279114 A1 | 10/2015 | Yonekubo | |
| 2016/0077338 A1* | 3/2016 | Robbins ............ | G02B 27/0172 345/8 |
| 2016/0231568 A1 | 8/2016 | Saarikko et al. | |
| 2017/0038593 A1 | 2/2017 | Travers | |
| 2017/0276948 A1 | 9/2017 | Welch et al. | |

(Continued)

FOREIGN PATENT DOCUMENTS

| KR | 10-2007-0009177 A | 1/2007 |
|---|---|---|
| KR | 10-2016-0060619 A | 5/2016 |

OTHER PUBLICATIONS

Communication dated Jul. 30, 2020, issued by the International Searching Authority in counterpart International Application No. PCT/KR2020/005242 (PCT/ISA/220, 210, 237).

(Continued)

*Primary Examiner* — Sahlu Okebato
(74) *Attorney, Agent, or Firm* — Sughrue Mion, PLLC

(57) ABSTRACT

Provided is a glasses-type display apparatus. The glasses-type display apparatus includes an optical engine configured to project light containing an image; a waveguide including an input region for receiving the projected light and an output region for outputting at least a portion of the received light; and a glasses-type body for holding the waveguide and the optical engine where a portion of the optical engine is arranged at a side portion of the waveguide.

19 Claims, 18 Drawing Sheets

(56) References Cited

U.S. PATENT DOCUMENTS

| | | |
|---|---|---|
| 2018/0120559 A1 | 5/2018 | Yeoh et al. |
| 2018/0143427 A1* | 5/2018 | Griffin et al. |
| 2019/0094544 A1* | 3/2019 | Alexander ......... G02B 26/0833 |
| 2019/0113825 A1* | 4/2019 | Alexander ........... G02B 6/0016 |
| 2019/0229495 A1* | 7/2019 | Pierer .................. H01S 5/4093 |
| 2019/0272802 A1* | 9/2019 | Haba ................. G02B 27/0172 |
| 2020/0004020 A1* | 1/2020 | Bhakta ................ G02B 27/126 |
| 2020/0278554 A1 | 9/2020 | Schultz et al. |

OTHER PUBLICATIONS

Communication dated Aug. 9, 2021 issued by the European Intellectual Property Office in counterpart European Application No. 20808940.9.

* cited by examiner

GLASSES-TYPE DISPLAY APPARATUS

CROSS-REFERENCE TO RELATED APPLICATIONS

This application is based on and claims the benefit of U.S. Provisional Patent Application No. 62/850,814, filed on May 21, 2019, in the United States Patent and Trademark Office, and claims priority under 35 U.S.C. § 119 to Korean Patent Application No. 10-2019-0167134, filed on Dec. 13, 2019, in the Korean Intellectual Property Office, the disclosures of which are incorporated herein by reference in their entirety.

BACKGROUND

1. Field

The disclosure relates to display apparatuses, and more particularly, to glasses-type display apparatuses to be worn by users.

2. Description of Related Art

A wearable display apparatus allows a user to view a displayed screen while wearing the wearable display apparatus. As research is actively conducted into such wearable display apparatuses, various types of wearable display apparatuses have been launched or are expected to be launched. For example, glasses-type display apparatuses and head mounted display apparatuses have been currently launched or are expected to be launched as wearable display apparatuses.

Because such a wearable display apparatus is intended to be worn by a user, it is required that the wearable display apparatus be light and thin considering user's usage environment. Thus, the wearable display apparatus uses a waveguide and a micro projector.

SUMMARY

Provided is a glasses-type display apparatus with improved mechanical stability.

Also, provided is a glasses-type display apparatus having an improved mechanical arrangement to alleviate limitations caused by the external shape thereof.

The technical problem to be solved is not limited to the above technical problems and there may be also other technical problems.

Additional aspects will be set forth in part in the description which follows and, in part, will be apparent from the description, or may be learned by practice of the presented embodiments of the disclosure.

According to an embodiment of the disclosure, a glasses-type display apparatus includes an optical engine configured to project light containing an image, a waveguide including an input region for receiving the projected light and an output region for outputting at least a portion of the received light, and a glasses-type body for holding the waveguide and the optical engine where a portion of the optical engine is arranged at a side portion of the waveguide.

In an example embodiment of the disclosure, the glasses-type body may include a frame and temples respectively connected to both end portions of the frame and extending in one direction, and the optical engine may be installed in at least one of both end pieces of the frame.

In an example embodiment of the disclosure, the frame and the temples may be connected to each other by hinges. Alternatively, the frame and the temples may be continuously connected to each other.

In an example embodiment of the disclosure, the optical engine may include a housing for mounting optical components, the housing may be fixed to the glasses-type body by a fixing member, and the fixing member may adjust a projection position in the optical engine.

In an example embodiment of the disclosure, the fixing member may adjust at least two points of the housing and may tilt an optical axis direction of the light projected from the optical engine by adjustment of the fixing member.

In an example embodiment of the disclosure, the fixing member may include a screw or a bolt.

In an example embodiment of the disclosure, the optical engine may include an illumination optical system configured to output light, an image forming and projecting unit configured to receive the light from the illumination optical system, form an image, and project light of the image onto the waveguide, and a light path changer for changing a light path in the optical engine, and at least one light path changer may be configured such that a portion of the illumination optical system may protrude more than the image forming and projecting unit based on a light projection direction of the image forming and projecting unit.

In an example embodiment of the disclosure, the image forming and projecting unit may include an image panel configured to receive the light from the illumination optical system to form an image and a projection optical system configured to project the image formed by the image panel onto the waveguide.

In an example embodiment of the disclosure, the image forming and projecting unit may include a light scanning unit configured to scan the light from the illumination optical system to the waveguide to form an image.

According to another embodiment of the disclosure, a glasses-type display apparatus includes a waveguide for receiving a projected light and for outputting at least a portion of the received light, and an optical engine configured to project light containing an image onto one region of the waveguide where the optical engine includes an illumination optical system configured to output light, an image forming and projecting unit configured to receive the light from the illumination optical system, form an image, and project the image onto the waveguide, and at least one light path changer changing a light path in the optical engine, and the at least one light path changer is configured such that a portion of the illumination optical system is arranged at a side portion of the waveguide.

In an example embodiment of the disclosure, the image forming and projecting unit may include an image panel configured to receive the light from the illumination optical system to form an image and a projection optical system configured to project the image formed by the image panel onto the waveguide, and the portion of the illumination optical system may be configured to protrude more than an output surface of the projection optical system based on an optical axis direction of the projection optical system.

In an example embodiment of the disclosure, the image panel may include a reflective image panel, the image forming and projecting unit may further include a deflector arranged on a light path between the reflective image panel and the projection optical system, and the deflector may reflect the light output by the illumination optical system to the image panel and transmit the light of the image reflected by the image panel to the projection optical system.

In an example embodiment of the disclosure, the image forming and projecting unit may include a scanning mirror configured to scan the light from the illumination optical system onto the waveguide to form an image.

In an example embodiment of the disclosure, the illumination optical system may include at least one light source including a light emitting diode (LED), a laser diode (LD), an organic light emitting diode (OLED), or a lamp.

In an example embodiment of the disclosure, the light path changer may include a reflection mirror or a total reflection prism.

In an example embodiment of the disclosure, the illumination optical system may include a first light source configured to output first monochromatic light, a second light source configured to output second monochromatic light, a third light source configured to output third monochromatic light, and a light combiner combining the first monochromatic light, the second monochromatic light, and the third monochromatic light into a single light path, the first monochromatic color, the second monochromatic color, and the third monochromatic color are different monochromatic colors, and the protruding portion of the illumination optical system may include at least one of the first light source, the second light source, or the third light source.

In an example embodiment of the disclosure, the waveguide may include a first region facing the image forming and projecting unit to receive an input of an image, a second region transmitting the image input to the first region, and a third region outputting the image transmitted by the second region, and the protruding portion of the illumination optical system may be located adjacent to the first region of the waveguide.

In an example embodiment of the disclosure, the waveguide may include a front surface and a rear surface opposite to the front surface, and the protruding portion of the illumination optical system may be located in front of the rear surface of the waveguide based on a thickness direction of the waveguide.

In another embodiment of the disclosure, a glasses-type display apparatus includes an optical engine configured to project light containing an image, and a waveguide including a front surface and a rear surface opposite to the front surface and receiving the projected light at the rear surface and reflect at least a portion of the received light between the front surface and the rear surface to be output to the rear surface where a portion of the optical engine is located in front of the rear surface of the waveguide based on a thickness direction of the waveguide.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
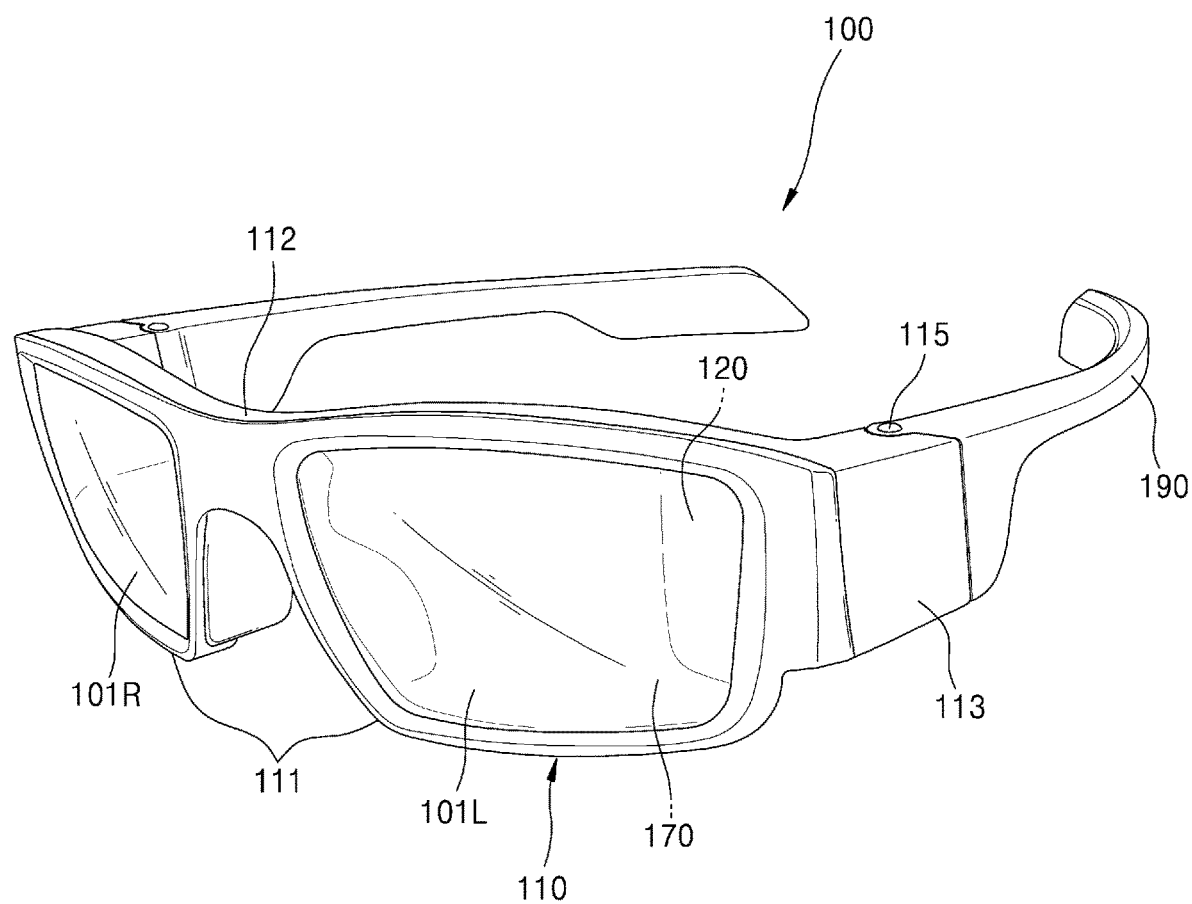
FIG. 1 is a diagram illustrating an appearance of a glasses-type display apparatus according to an embodiment of the disclosure.

Hereinafter, embodiments of the disclosure will be described in detail with reference to the accompanying drawings. In the drawings, like reference numerals may denote like elements, and the size of each element may be exaggerated for clarity and convenience of description. The embodiments described below are merely examples, and various modifications may be made therein.

Throughout the disclosure, the expression "at least one of a, b, or c" indicates only a, only b, only c, both a and b, both a and c, both b and c, all of a, b, and c, or variations thereof.

As used herein, the singular forms "a", "an", and "the" are intended to include the plural forms as well, unless the context clearly indicates otherwise. Also, when something is referred to as "including" a component, another component may be further included unless specified otherwise.

Figure 2:
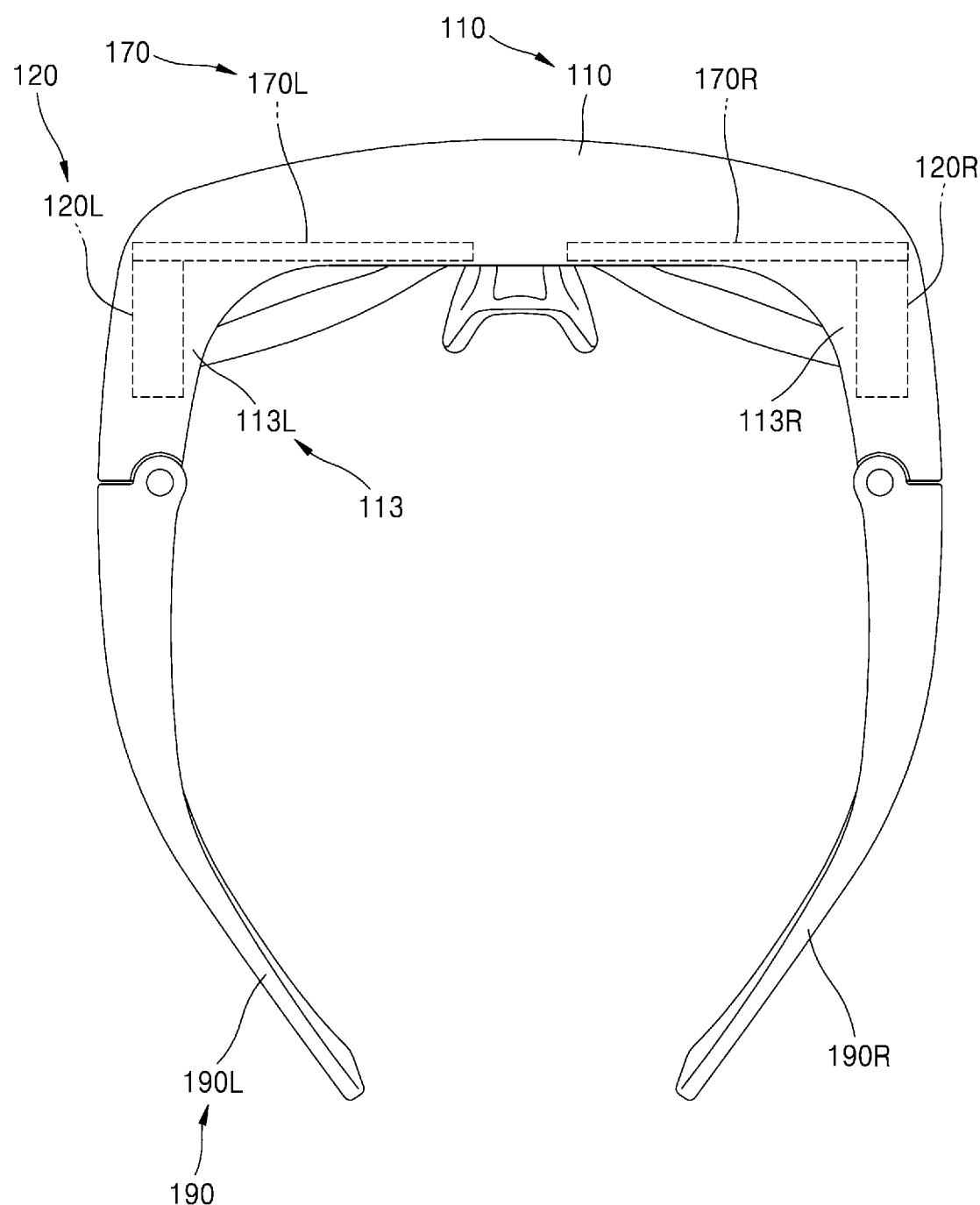
FIG. 2 is a plan view of the glasses-type display apparatus of FIG. 1.

FIG. 1 is a diagram illustrating an appearance of a glasses-type display apparatus 100 according to an embodiment of the disclosure, and FIG. 2 is a plan view of the glasses-type display apparatus 100 of FIG. 1.

Referring to FIGS. 1 and 2, the glasses-type display apparatus 100 may include a glasses-type body configured to be worn by a user.

The glasses-type body may include a frame 110 and temples 190.

The frame 110 may include, for example, a bridge 112 and two rims 111 connected by the bridge 112, and eyeglasses 101L and 101R are located in the two rims 111. The eyeglasses 101L and 101R are merely an example and may or may not have refractive power (diopter). Alternatively, the eyeglasses 101L and 101R may be integrally formed, and in this case, the rim 111 and the bridge 112 of the frame 110 may not be distinguished from each other. The eyeglasses 101L and 101R may be omitted.

The temples 190 may be respectively connected to both end pieces 113 of the frame 110 and may extend in one direction. Both end pieces 113 of the frame 110 and the temples 190 may be connected by hinges 115. The hinges 115 are merely an example and other known members may also be used to connect both end pieces 113 of the frame 110 and the temples 190.

The temples 190 may be bent with a certain elastic force such that the glasses-type display apparatus 100 may be worn by the user. The frame 110 may have rigidity relative to the temples 190. As another example, the temples 190 may relatively have rigidity and an elastic member may be coupled to the hinge 115. Here, "relatively have rigidity" may mean that the temples 190 may be slightly bent.

The glasses-type display apparatus 100 may include a waveguide 170. The waveguide 170 may be configured to receive an input of projected light in an input region and output at least a portion of the input light in an output region. The waveguide 170 may include a left-eye waveguide 170L and a right-eye waveguide 170R. The left-eye waveguide 170L and the right-eye waveguide 170R may be respectively attached to the eyeglasses 101L and 101R. Alternatively, the left-eye waveguide 170L and the right-eye waveguide 170R may be fixed to the rims 111 separately from the eyeglasses 101L and 101R. In addition, the left-eye waveguide 170L and the right-eye waveguide 170R may be integrally formed, and in this case, the rim 111 and the bridge 112 of the frame 110 may not be distinguished from each other.

The glasses-type display apparatus 100 may include an optical engine 120 (e.g., a projector) projecting light containing an image. The optical engine 120 may include a left-eye optical engine 120L and a right-eye optical engine 120R. The left-eye optical engine 120L and the right-eye optical engine 120R may be located at both end pieces 113 of the frame 110. Both end pieces 113 of the frame 110 may be formed of a rigid material to have rigidity for maintaining the alignment of the optical engine 120 and the waveguide 170. Both end pieces 113 of the frame 110 may be rim extension portions integrally formed with the rims 111. Alternatively, both end pieces 113 of the frame 110 may be separately manufactured and then fixed to the rims 111 so as not to move. As such, by forming both end pieces 113 of the frame 110 with a rigid material, the alignment of the optical engine 120 and the waveguide 170 may be maintained even when the user spreads the temples 190 horizontally when the user wears the glasses-type display apparatus 100.

Next, the optical engine 120 and the waveguide 170 will be described in detail. In the following description, the left-eye waveguide 170L and the left-eye optical engine 120L will be described as an example; however, because the left-eye thing and the right-eye thing have a symmetrical structure with respect to each other, those of ordinary skill in the art will understand that the same may also be applied to the right-eye waveguide 170R and the right-eye optical engine 120R.

Figure 3:
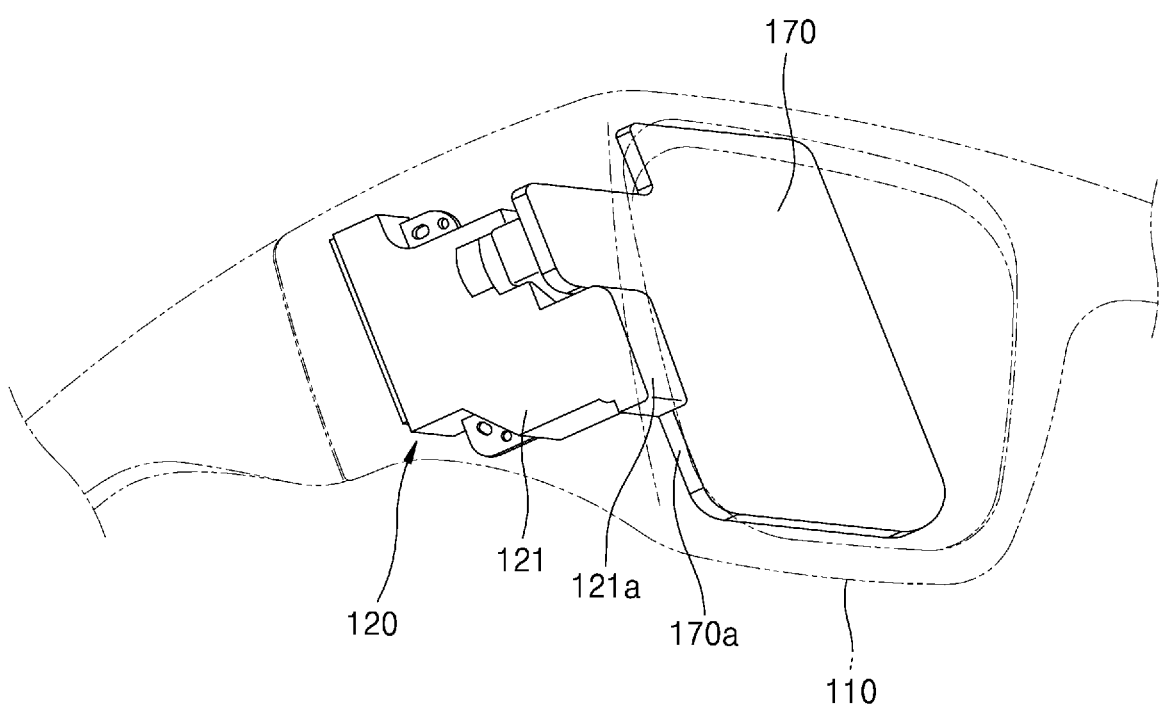
FIG. 3 is a diagram illustrating a coupling structure of an optical engine and a waveguide according to an embodiment of the disclosure.
Figure 4:
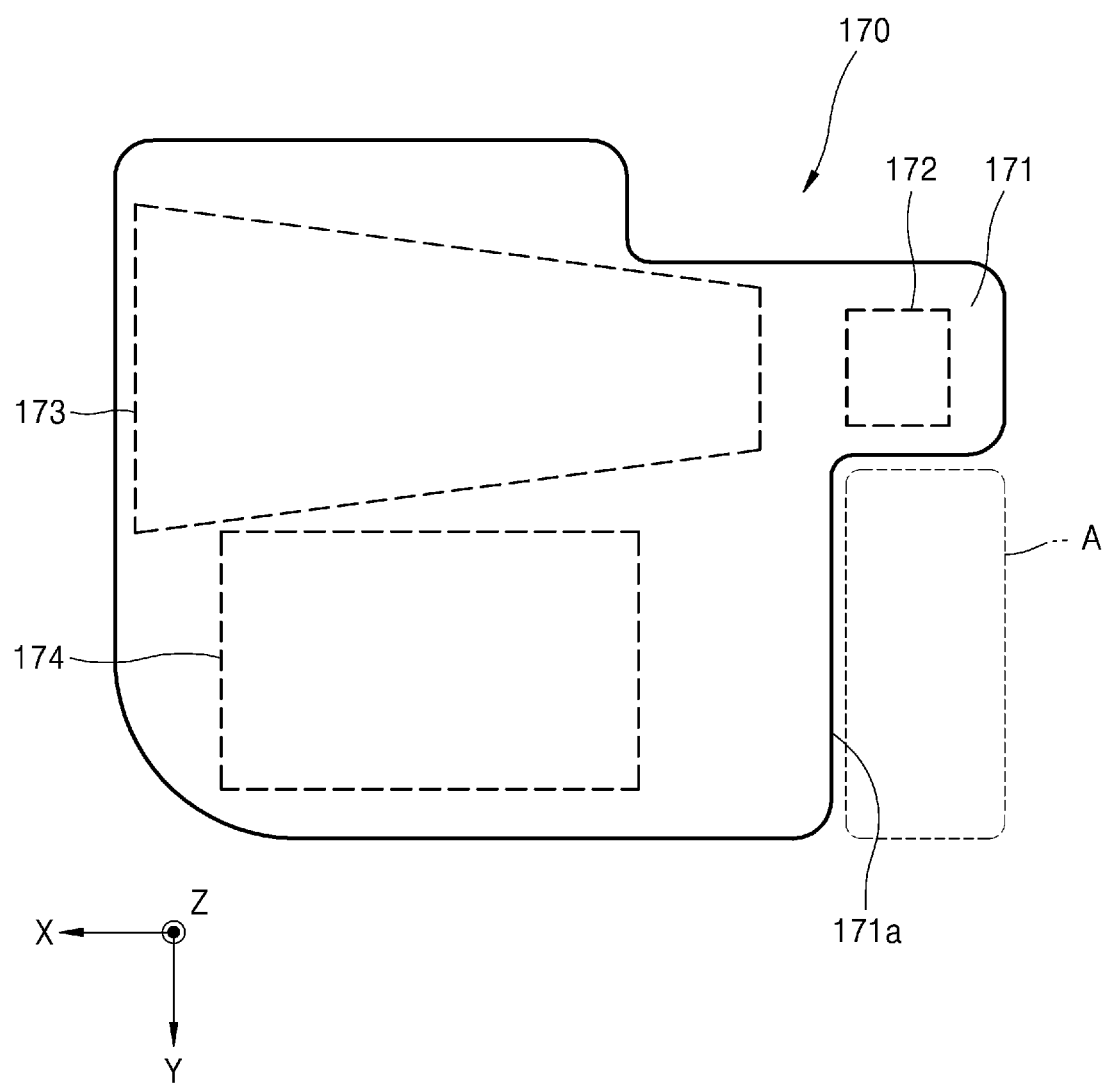
FIG. 4 is a diagram illustrating an arrangement of an optical engine according to a waveguide according to an embodiment of the disclosure.

FIG. 3 is a diagram illustrating a coupling structure of an optical engine 120 and a waveguide 170 according to an embodiment of the disclosure, and FIG. 4 is a diagram illustrating an arrangement of an optical engine 120 according to a waveguide 170 according to an embodiment of the disclosure.

Referring to FIGS. 3 and 4, the waveguide 170 may be mounted in the frame 110 such that at least a partial region of the rear surface of the waveguide 170 may be seen when the user wears the glasses-type display apparatus 100. Here, the rear surface of the waveguide 170 may refer to a surface facing the user's eye when the user wears the glasses-type display apparatus 100, and the front surface of the waveguide 170 may refer to a surface opposite to the rear surface (i.e., a side far from the user's eye).

The waveguide 170 may be formed as a flat plate 171 having a single-layer or multilayer structure of a transparent material in which light may be reflected and transmitted. The waveguide 170 may include a first region 172 facing an output surface of the optical engine 120 to receive an input of light of an image projected, a second region 173 transmitting the light of the image input to the first region 172, and a third region 174 outputting the light of the image transmitted by the second region 173. Here, the transparent material may refer to a material through which light may pass, its transparency may not be 100%, and it may have a certain color.

As the waveguide 170 of the present embodiment of the disclosure is formed of a transparent material, the user may not only view an image through the glasses-type display apparatus 100 but also view an external scene and thus the glasses-type display apparatus 100 may implement augmented reality.

The first to third regions 172, 173, and 174 may be formed based on holographic (e.g., diffractive) optics or based on reflective and refractive optics.

For example, a diffraction grating may be formed in the first region 172 to couple the input light and transmit the same in a first direction (X direction). The optical engine 120 may be arranged such that the output light may be input in a direction (Z direction) perpendicular to the first region 172 or at an angle with respect to the perpendicular direction (Z direction). Such an arrangement direction of the optical engine 120 may vary according to the pattern of the diffraction grating of the first region 172.

The second region 173 may be located in the first direction (X direction) with respect to the first region 172. A diffraction grating may be formed in the second region 173 to transmit at least a portion of the light received from the first region 172 in a second direction (Y direction). The light input to the first region 172 may be reflected and transmitted between the front surface and the rear surface of the waveguide 170.

The third region 174 may be located in the second direction (Y direction) with respect to the second region 173. A diffraction grating may be formed in the third region 174 such that at least a portion of the light transmitted from the second region 173 may be output in a direction (Z direction) perpendicular to the waveguide 170.

In an embodiment of the disclosure, when the flat plate 171 has a single-layer structure, the diffraction grating of the first region 172, the diffraction grating of the second region 173, and the diffraction grating of the third region 174 may be formed on the same surface or different surfaces of the flat plate 171.

In an embodiment of the disclosure, when the flat plate 171 has a multilayer structure, the diffraction grating of the first region 172, the diffraction grating of the second region 173, and the diffraction grating of the third region 174 may be formed in the same layer or different layers of the flat plate 171.

In an embodiment of the disclosure, the diffraction grating of the first region 172, the diffraction grating of the second region 173, and the diffraction grating of the third region 174 may have patterns different from each other in terms of at least one of a grating interval, a grating pitch, a grating height, a grating shape, a pattern shape, and the like.

In an embodiment of the disclosure, the diffraction grating of the first region 172, the grating of the second region 173, and the diffraction grating of the third region 174 have the same pattern but the pattern directions thereof may be different from each other.

When the flat plate 171 has a multilayer structure, the second region 173 may partially overlap the first region 172 and the third region 174.

The first to third regions 172, 173, and 174 may include one or more reflectors (e.g., an array of micromirrors or other reflectors) instead of the diffraction grating.

In the waveguide 170 described above, a region (region A) in the second direction (Y direction) with respect to the first region 172 may be a region that is not utilized in the waveguide 170. Thus, the waveguide 170 may have a shape 171*a* without the region A, and a portion of the optical engine 120 of the projector may be located in the region A.

In the drawings, the X direction and the Y direction correspond to an example in which the first direction and the second direction are perpendicular to each other; however, the disclosure is not limited thereto. When the first direction and the second direction are different from each other although not perpendicular to each other, because the region (region A) in the second direction (Y direction) with respect to the first region 172 is a region that is not utilized in the waveguide 170, the arrangement of the present embodiment of the disclosure may be applied as is.

Next, the structure of the optical engine 120 enabling the above arrangement will be described.

Figure 5:
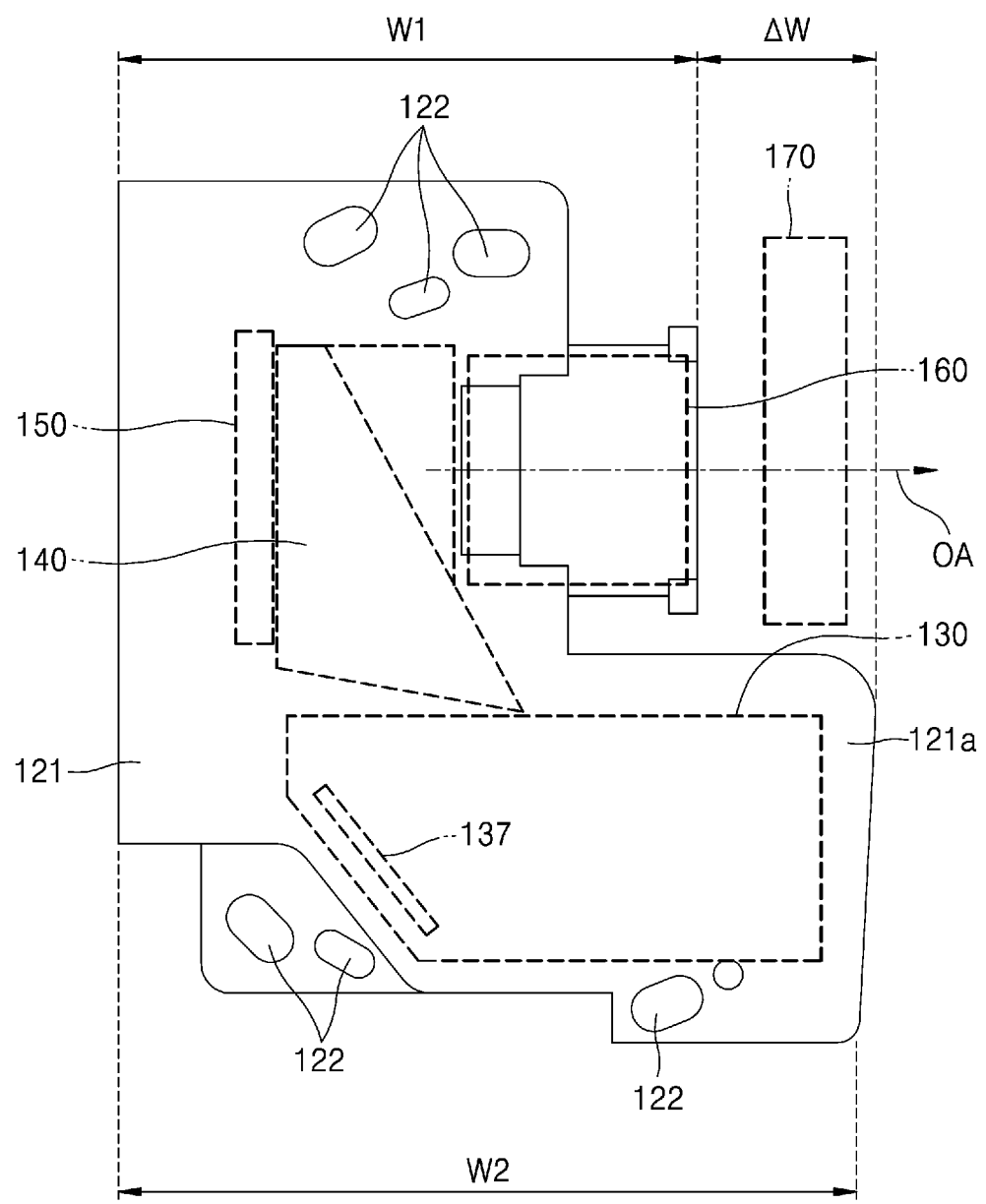
FIG. 5 is a diagram illustrating an arrangement of an illumination optical system, a light path changer, an image panel, and a projection optical system in an optical engine according to an embodiment of the disclosure.

FIG. 5 is a diagram illustrating an arrangement of an illumination optical system 130, a light path changer 137, a deflector 140, an image panel 150, and a projection optical system 160 in an optical engine 120 according to an embodiment of the disclosure.

Referring to FIG. 5, the optical engine 120 may include the illumination optical system 130, the light path changer 137, the deflector 140, the image panel 150, the projection optical system 160, and a housing 121 for mounting these optical components. The deflector 140, the image panel 150 and the projection optical system 160 may be components of a unit referred to as an image forming and projecting unit in the disclosure.

The illumination optical system 130 may be an optical component outputting light and may include a light source and lenses.

The deflector 140 may be arranged on a light path between the image panel 150 and the projection optical system 160. The deflector 140 may be configured to reflect the light output from the illumination optical system 130 and transmit the light reflected from the image panel 150.

The image panel 150 may be a reflective image panel that modulates the light output from the illumination optical system 130 into light containing a two-dimensional image and reflects the same. The reflective image panel may be, for example, a Digital Micromirror Device (DMD) panel, a Liquid Crystal on Silicon (LCoS) panel, or any other known reflective image panel.

The projection optical system 160 may project the light containing the image reflected from the image panel 150 onto the waveguide 170 and may include one or more projection lenses. Herein, the projection surface of the projection optical system 160 may refer to the output surface of the outermost projection lens among the one or more projection lenses.

The illumination optical system 130 may have a certain physical length due to the lenses therein, and the length of the illumination optical system 130 may be a limiting factor in reducing the size of the optical engine 120. In the present embodiment of the disclosure, the light path changer 137 may be arranged in the illumination optical system 130 such that the light output from the illumination optical system 130 may be output in a direction perpendicular or inclined to the lengthwise direction of the illumination optical system 130.

As described above, because the reflective image panel is used as the image panel 150 and the light path changer 137 is arranged in the illumination optical system 130, a width W1 of the side of the projection optical system 160 of the housing 121 of the optical engine 120 may be greatly reduced. For example, based on a vertical axis of the projection surface of the projection optical system 160 (i.e., an optical axis OA of projected light), the side of the illumination optical system 130 of the housing 121 may be a protruding portion 121*a* that protrudes by ΔW in the direction of the optical axis OA of the projected light in comparison with the projection surface of the projection optical system 160. In other words, a width W2 of the side of the illumination optical system 130 of the housing 121 may be greater than the width W1 of the side of the projection optical system 160 of the housing 121 based on the direction of the optical axis OA of the projected light. As described above, because the protruding portion 121*a* of the side of the illumination optical system 130 of the housing 121 is located in an unused region (the region A of FIG. 4) of the waveguide 170, the width of an assembly structure of the waveguide 170 and the optical engine 120 may be reduced to the minimum.

Referring to FIG. 1, because the optical engine 120 is arranged at both end pieces 113 of the frame 110 in the glasses-type display apparatus 100 of the present embodiment of the disclosure, the widths W1 and W2 of the housing 121 of the optical engine 120 may be a factor determining the width of both end pieces 113 of the frame 110. Thus, by reducing the width W1 of the side of the projection optical system 160 of the housing 121, the width of both end pieces 113 of the frame 110 may be reduced accordingly. By reducing the size of both end pieces 113 of the frame 110 as such, the appearance of the glasses-type display apparatus 100 of the present embodiment of the disclosure may not be significantly deviated from a general glasses design, the user may have a minimized resistance in using the glasses-type display apparatus 100 of the present embodiment of the disclosure, and the product may be more freely designed.

In addition, by reducing the width of both end pieces 113 of the frame 110 where the optical engine 120 is mounted, the distortion of both end pieces 113 of the frame 110 may be further suppressed even when the temples 190 are spread horizontally and thus a certain force is applied to both end pieces 113 of the frame 110 when the user wears the glasses-type display apparatus 100.

When the alignment of the optical engine and the waveguide is slightly distorted, the image may be greatly inclined or moved when the image is finally output to the user's eyeballs. In addition, when an image is displayed by using a horizontal binocular parallax, even when the direction of the image is slightly dislocated, a correct image may not be transmitted to the user to cause dizziness. In regard to this problem, in the glasses-type display apparatus 100 of the present embodiment of the disclosure, the alignment of the optical engine 120 and the waveguide 170 may be accurately maintained by reducing the width of both end pieces 113 of the frame 110 where the optical engine 120 is mounted.

Figure 6:
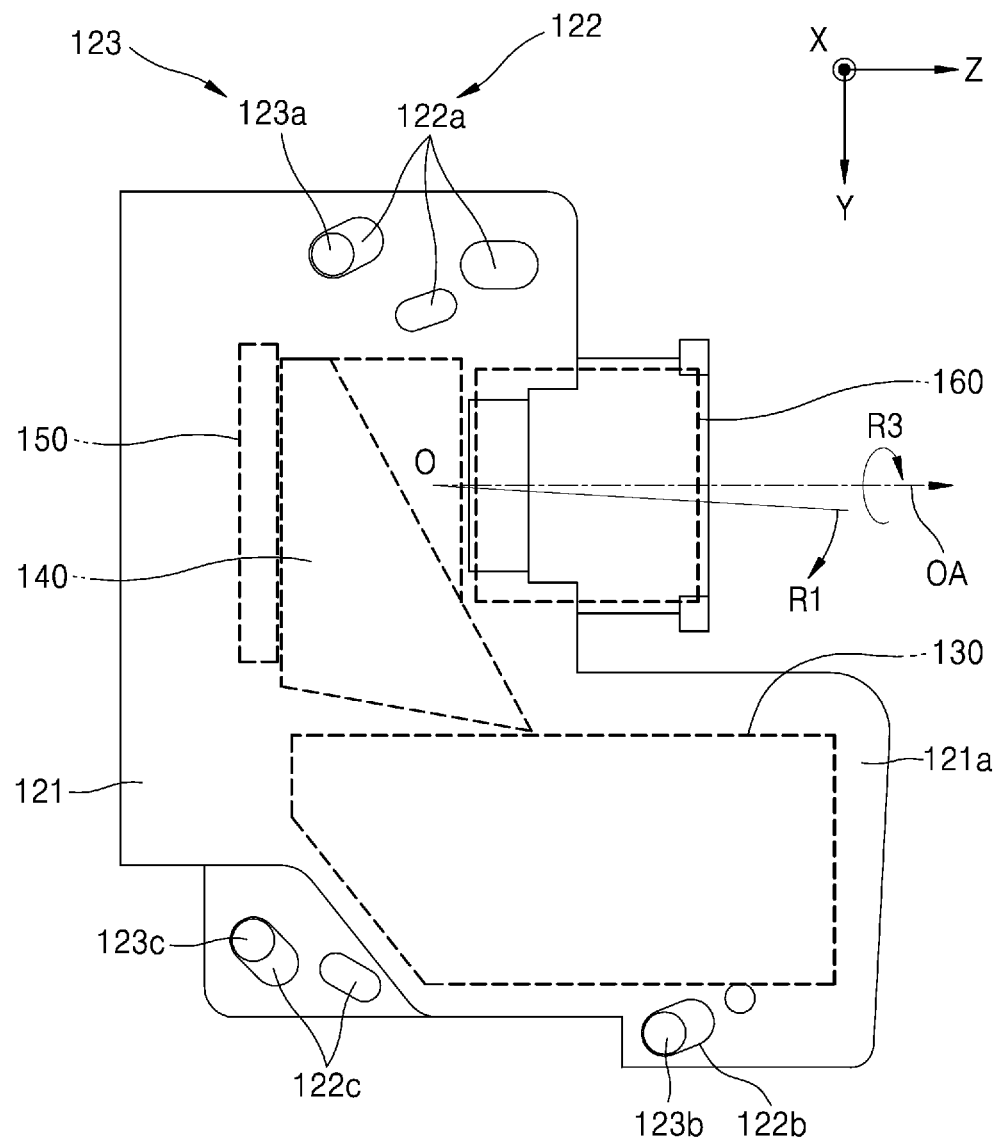
FIG. 6 is a diagram illustrating an example of adjusting a projection direction of the optical engine of FIG. 5.
Figure 7:
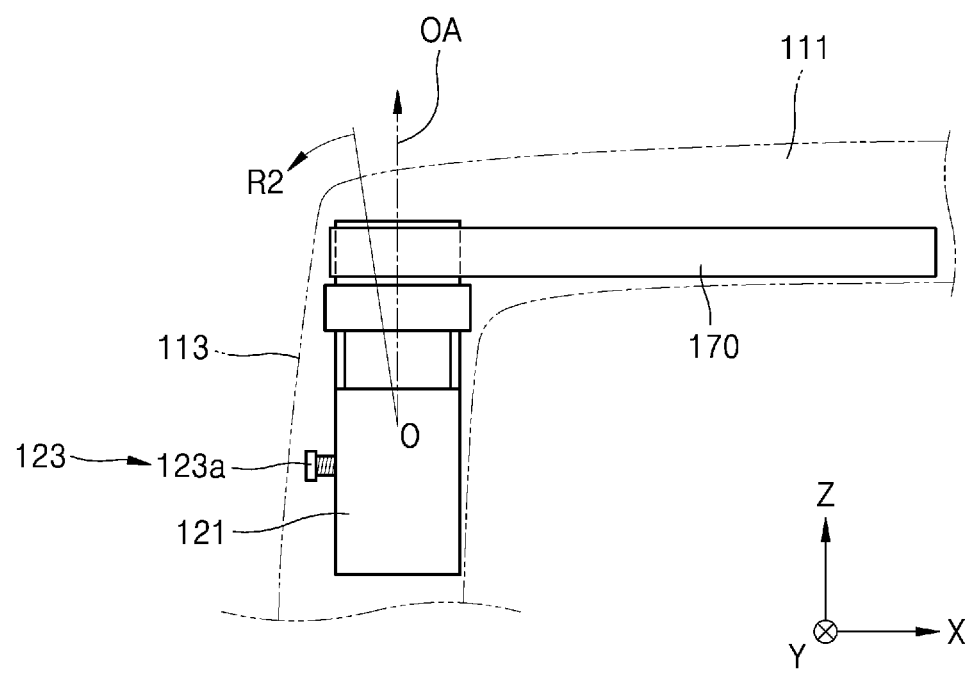
FIG. 7 is a diagram illustrating an example of adjusting a projection direction of the optical engine of FIG. 5.

FIG. 6 is a diagram illustrating an example of adjusting a projection direction of the optical engine of FIG. 5, and FIG. 7 is a diagram illustrating an example of adjusting a projection direction of the optical engine of FIG. 5.

In the glasses-type display apparatus 100 according to an embodiment of the disclosure, the optical engine 120 may be fixed by a fixing member (e.g., a fastener) 123 in a state of being fixed to both end pieces 113 of the frame 110. The fixing member 123 may be, for example, a screw or a bolt; however, the disclosure is not limited thereto. For example, in an assembly process, the optical engine 120 may be fixed by an adhesive in a state of being arranged at the frame 110 by a jig.

The housing 121 of an embodiment of the disclosure may be provided with a fixing groove 122. One or more fixing members 123 may be provided and the fixing groove 122 may be provided corresponding to the number of fixing members 123. The fixing groove 122 may be formed as a rectangular groove or a curved groove. When the fixing groove 122 is formed as a rectangular groove or a curved groove, the position and the projection direction of the optical engine 120 may be adjusted when the optical engine 120 is repaired or assembled to the housing 121.

In an embodiment of the disclosure, fixing grooves 122a, 122b, and 122c and fixing members 123a, 123b, and 123c may be provided at a plurality of different positions, and in an assembly or repair process, the direction of the optical axis OA of the light projected from the optical engine 120 may be tilted by adjusting the fixing members 123a, 123b, and 123c. For example, by adjusting the fixing member 123a, the housing 121 may be tilted in an R1 direction or an R2 direction around a certain reference point O. The R1 direction may refer to the direction of rotating on the X axis around the reference point O, and the R2 direction may refer to the direction of rotating on the Y axis around the reference point O. Alternatively, by adjusting the fixing members 123a, 123b, and 123c, the image projected by the optical engine 120 may be rotated in an R3 direction on the optical axis OA (i.e., the Z axis). Through this adjustment, by rotating the image output to the user's eyeball or by moving the same by using a tilt, the left and right images may be accurately matched.

Next, a particular optical system of the optical engine 120 will be described.

Figure 8:
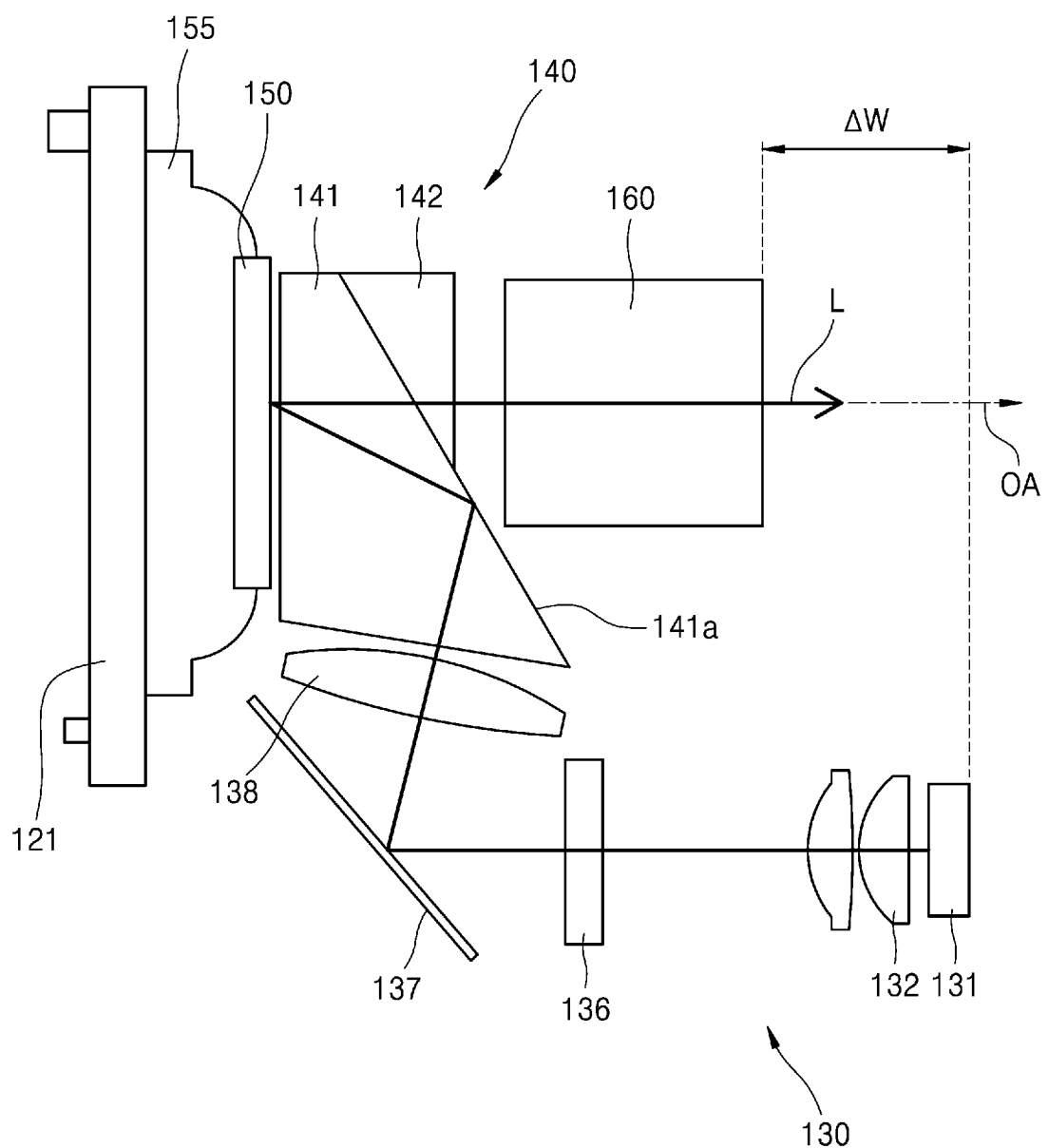
FIG. 8 is a diagram illustrating an optical engine according to an embodiment of the disclosure.

FIG. 8 is a diagram illustrating an optical engine according to an embodiment of the disclosure. Referring to FIG. 8, the optical engine of the present embodiment of the disclosure may include an illumination optical system 130 outputting monochromatic light, a deflector 140, an image panel 150, and a projection optical system 160. A reference numeral 155 denotes an image panel holder for fixing the image panel 150 to the housing 121.

The illumination optical system 130 of an embodiment of the disclosure may include a monochromatic light source 131 outputting monochromatic light. The monochromatic light source 131 may include a light emitting diode (LED), a laser diode (LD), an organic light emitting diode (OLED), or a lamp.

The illumination optical system 130 of an embodiment of the disclosure may include a collimating lens 132 focusing or shaping light into parallel beams, a flyeye lens 136 uniformizing light, and a relay lens 138 transmitting light to the image panel 150. The illumination optical system 130 may further include an opening stop forming a beam cross-section of light, an ultraviolet filter, or the like. Some of the optical members constituting the illumination optical system 130 may be omitted or may be functionally coupled. For example, one lens member may perform the functions of the collimating lens and the flyeye lens or may further perform the function of the relay lens.

The light path changer 137 may be arranged on a light path of the illumination optical system 130 according to an embodiment of the disclosure. The light path changer 137 may be located between the flyeye lens 136 and the relay lens 138. The monochromatic light source 131, the collimating lens 132, and the flyeye lens 136 constituting the illumination optical system 130 may have a certain physical length in the optical axis direction; however, the overall length of the optical engine may be minimized as the light path is folded by the light path changer 137.

FIG. 8 illustrates a case where the light path changer 137 is located between the flyeye lens 136 and the relay lens 138; however, the disclosure is not limited thereto. For example, the light path changer 137 may be located at the output end side of the relay lens 138 or may be located at the input end side of the flyeye lens 136. When the flyeye lens 136 includes a plurality of sheets, the light path changer 137 may be located on a light path between the plurality of sheets of the flyeye lens 136. The light path changer 137 may include a mirror or a total reflection prism. The light path changer 137 may bend the path of the light output by the illumination optical system 130.

The deflector 140 of an embodiment of the disclosure may have a structure in which first and second prisms 141 and 142 are joined.

In an embodiment of the disclosure, the first and second prisms 141, 142 may have the same refractive index. A first region 141a of the joint surface of the first prism 141 may be arranged not to contact the second prism 142. The illumination optical system 130 may be arranged such that the light input to the first prism 141 may be directed to the first region 141a. Because the light input to the first prism 141 is incident on the first region 141a at an incidence angle greater than a critical angle of the first prism 141, the light input to the first prism 141 may be totally reflected by the first region 141a. The light totally reflected by the first region 141a may be reflected toward the image panel 150 to contain an image formed on the image panel 150. The light reflected by the image panel 150 may be directed to the projection optical system 160 through the first prism 141 and the second prism 142.

In an embodiment of the disclosure, the refractive index of the first prism 141 may be smaller than the refractive index of the second prism 142. In this case, at the joint surface of the first prism 141 and the second prism 142, the light incident on the first prism 141 may be totally reflected with respect to an incidence angle greater than a certain critical angle and may be transmitted with respect to an incidence angle smaller than the critical angle.

The configuration of the deflector 140 described above is merely an example and the disclosure is not limited thereto.

As another example, the deflector 140 may include one prism.

As another example, because the deflector 140 is partially reflectively coated to have a reflection region and a transmission region, the light output by the illumination optical system 130 may be reflected in the reflection region and the light reflected by the image panel 150 may be reflected in the transmission region.

As another example, the illumination optical system 130 may output a polarization beam and the deflector 140 may include a polarization beam splitter. Because a ¼ wave plate (not illustrated) is arranged between the image panel 150 and the deflector 140 to change the polarization direction, the deflector 140 may reflect the light output by the illumination optical system 130 and transmit the light reflected by the image panel 150.

As described above, the image panel 150 may be a reflective image panel that modulates the light output from the illumination optical system 130 into light containing a two-dimensional image and reflects the same.

As described above, the projection optical system 160 may project the light containing the image reflected by the image panel 150 onto the waveguide 170 and may include one or more projection lenses.

As described above, in the optical engine of the present embodiment of the disclosure, because the light path of the illumination optical system 130 is folded by the light path changer 137, a portion of the side of the light source 131 of the illumination optical system 130 may be configured to protrude by ΔW in the projection direction with respect to the output surface of the projection optical system 160. The light source 131 may be a component having a high heat value during driving; however, the light source 131 may be arranged at an outer side far from the wearer's skin due to the light path changer 137, thus improving the wearer's wearing feeling.

Figure 9:
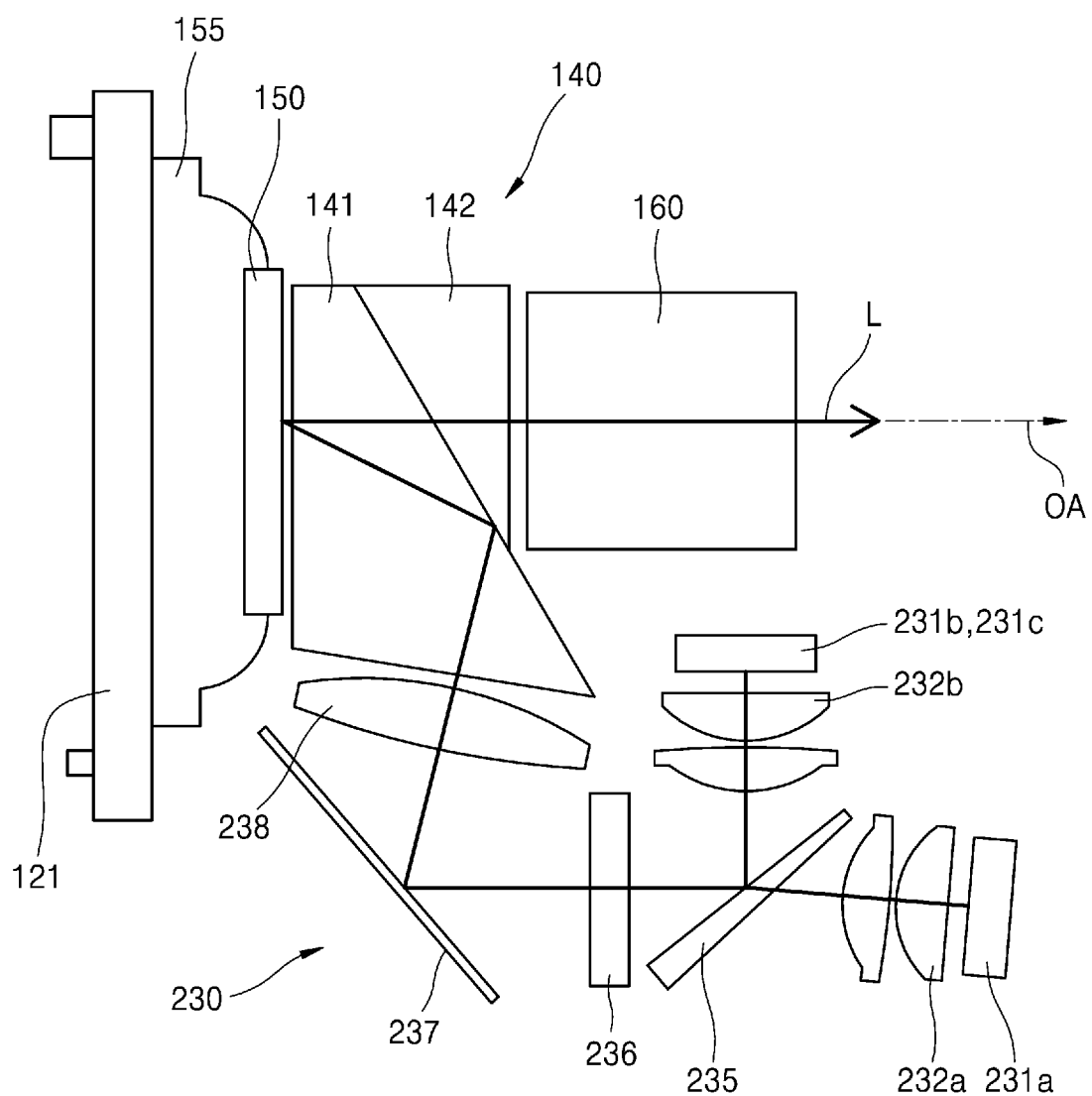
FIG. 9 is a diagram illustrating an optical engine according to another embodiment of the disclosure.

FIG. 9 is a diagram illustrating an optical engine according to another embodiment of the disclosure.

Referring to FIG. 9, the optical engine of the present embodiment of the disclosure may include an illumination optical system 230, a deflector 140, an image panel 150, and a projection optical system 160. The optical arrangement of the optical engine of the present embodiment of the disclosure may be substantially the same as that of the embodiment of the disclosure described with reference to FIG. 8 except that it outputs color light and projects light of a color image.

The illumination optical system 230 may include a first light source 231a outputting first monochromatic light, a second light source 231b outputting second monochromatic light, a third light source 231c outputting third monochromatic light, and a light coupler 235 coupling the first monochromatic light, the second monochromatic light, and the third monochromatic light into a single light path. The first monochromatic color, the second monochromatic color, and the third monochromatic color may be different monochromatic colors for implementing a color through light mixing. For example, the first monochromatic color, the second monochromatic color, and the third monochromatic color may be different monochromatic colors selected from the group consisting of red, green, and blue.

The light coupler 235 may include a dichroic mirror that transmits the first monochromatic light and reflects the second monochromatic light and the third monochromatic light. The light coupler 235 may be configured to have both surfaces of a plate shape as a reflective surface for the second monochromatic light and a reflective surface for the third monochromatic light. Alternatively, the light coupler 235 may be configured to have any one surface of a flat plate shape as a reflective surface for the second monochromatic light and a reflective surface for the third monochromatic light.

The first light source 231a may be located at one side of the light coupler 235, and the second light source 231b and the third light source 231c may be located at the other side of the light coupler 235. The second light source 231b and the third light source 231c may be arranged in parallel. The light coupler 235 including a single dichroic mirror is merely an example and the light coupler 235 may include two dichroic mirrors.

A first collimating lens 232a may be located between the light coupler 235 and the first light source 231a, and a second collimating lens 232b may be located between the light coupler 235 and the second light source 231b and the third light source 231c. That is, the second light source 231b and the third light source 231c may share the second collimating lens 232b. That is, the first monochromatic light output from the first light source 231a may be shaped into parallel beams in the first collimating lens 232a, and the second monochromatic light output from the second light source 231b and the third monochromatic light output from the third light source 231c may each be shaped into parallel beams in the second collimating lens 232b.

The synthetic light of the first to third monochromatic colors may be uniformized in the flyeye lens 236 and may be directed to the image panel 150 through the relay lens 238 after the light path thereof is converted in the light path changer 237.

The optical engine of the present embodiment of the disclosure may implement color images sequentially. That is, the first to third light sources 231a, 231b, and 231c may be sequentially driven to sequentially output the first monochromatic light, the second monochromatic light, and the third monochromatic light, and the image panel 150 may display first to third monochromatic images in synchronization with the first to third light sources 231a, 231b, and 231c sequentially driven, thereby implementing a color image.

As described above, because the light path is folded by the light path changer 237, some (i.e., the first light source 231a) of the first to third light sources 231a, 231b, and 231c of the illumination optical system 230 may be configured to protrude in the projection direction with respect to the output surface of the projection optical system 160 and the first to third light sources 231a, 231b, and 231c may be mounted in a narrow space by using the light coupler 235, thus minimizing the overall length of the optical engine.

Figure 10:
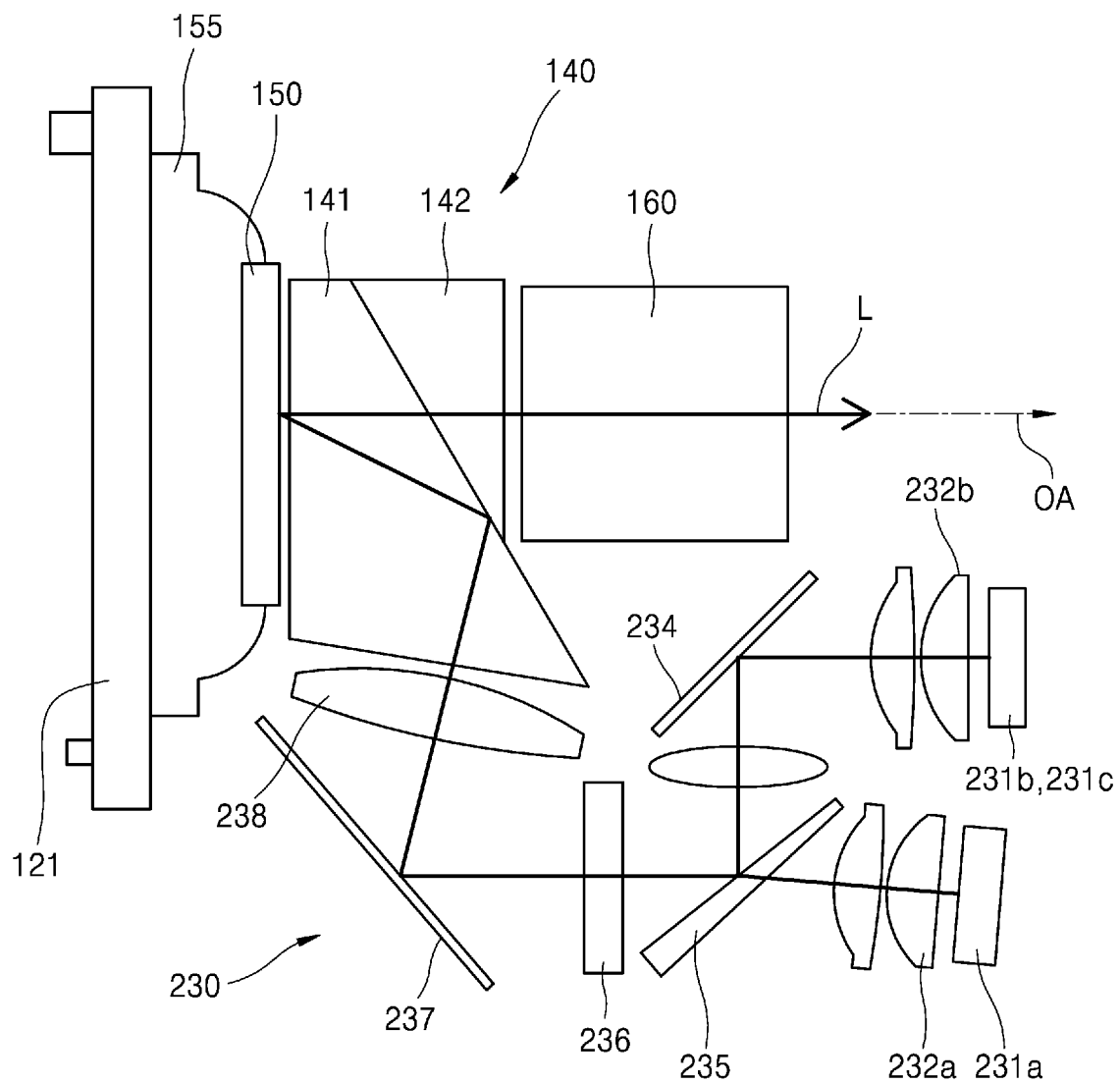
FIG. 10 is a diagram illustrating an optical engine according to another embodiment of the disclosure.

FIG. 10 is a diagram illustrating an optical engine according to another embodiment of the disclosure.

Referring to FIG. 10, the optical engine of the present embodiment of the disclosure may include an illumination optical system 230, a deflector 140, an image panel 150, and a projection optical system 160. The optical arrangement of the optical engine of the present embodiment of the disclosure may be substantially the same as that of the embodiment of the disclosure described with reference to FIG. 9 except that a second light path changer 234 is arranged between the light coupler 235 and the second and third light sources 231b and 231c and thus not only the first light source 231a but also the second and third light sources 231b and 231c are configured to protrude in the projection direction with respect to the output surface of the projection optical system 160.

Because the second and third light sources 231b and 231c are also arranged to protrude in the projection direction with respect to the output surface of the projection optical system 160 due to the second light path changer 234, the first to third light sources 231a, 231b, and 231c may be located at an unused and removed region (i.e., the region A in FIG. 4) in the waveguide 170 (see FIG. 4) and thus the illumination optical system 230 may be mounted in a more compact space, thus minimizing the overall length of the optical engine. Also, the first to third light sources 231a, 231b, and 231c may be arranged at an outer side farthest from the wearer's skin and thus the wearer's wearing feeling may be improved.

Figure 11:
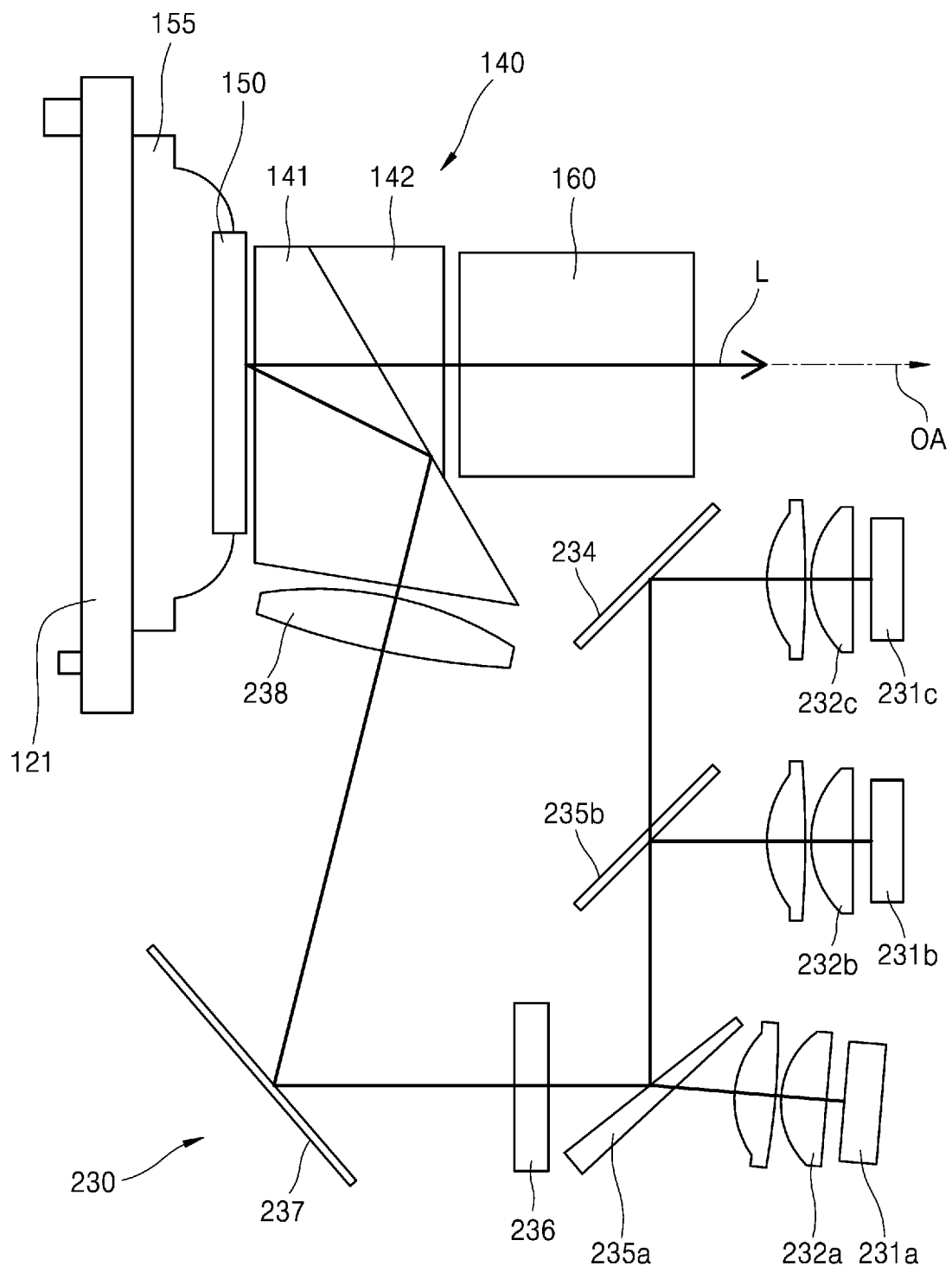
FIG. 11 is a diagram illustrating an optical engine according to another embodiment of the disclosure.

FIG. 11 is a diagram illustrating an optical engine according to another embodiment of the disclosure.

Referring to FIG. 11, the optical engine of the present embodiment of the disclosure may include an illumination optical system 230, a deflector 140, an image panel 150, and a projection optical system 160. The optical arrangement of the optical engine of the present embodiment of the disclosure may be substantially the same as that of the embodiment of the disclosure described with reference to FIG. 10 except that the second monochromatic light output from the second light source 231b and the third monochromatic light output from the third light source 231c are coupled into a single light path by a second light coupler 235b and the first monochromatic light output from the first light source 231a and the second monochromatic light and the third monochromatic light coupled by the second light coupler 235b are coupled into a single light path by a first light coupler 235a.

The first light coupler 235a may include a dichroic mirror that transmits the first monochromatic light and reflects the second monochromatic light and the third monochromatic light. The second light coupler 235b may include a dichroic mirror that transmits the third monochromatic light and reflects the second monochromatic light.

Figure 12:
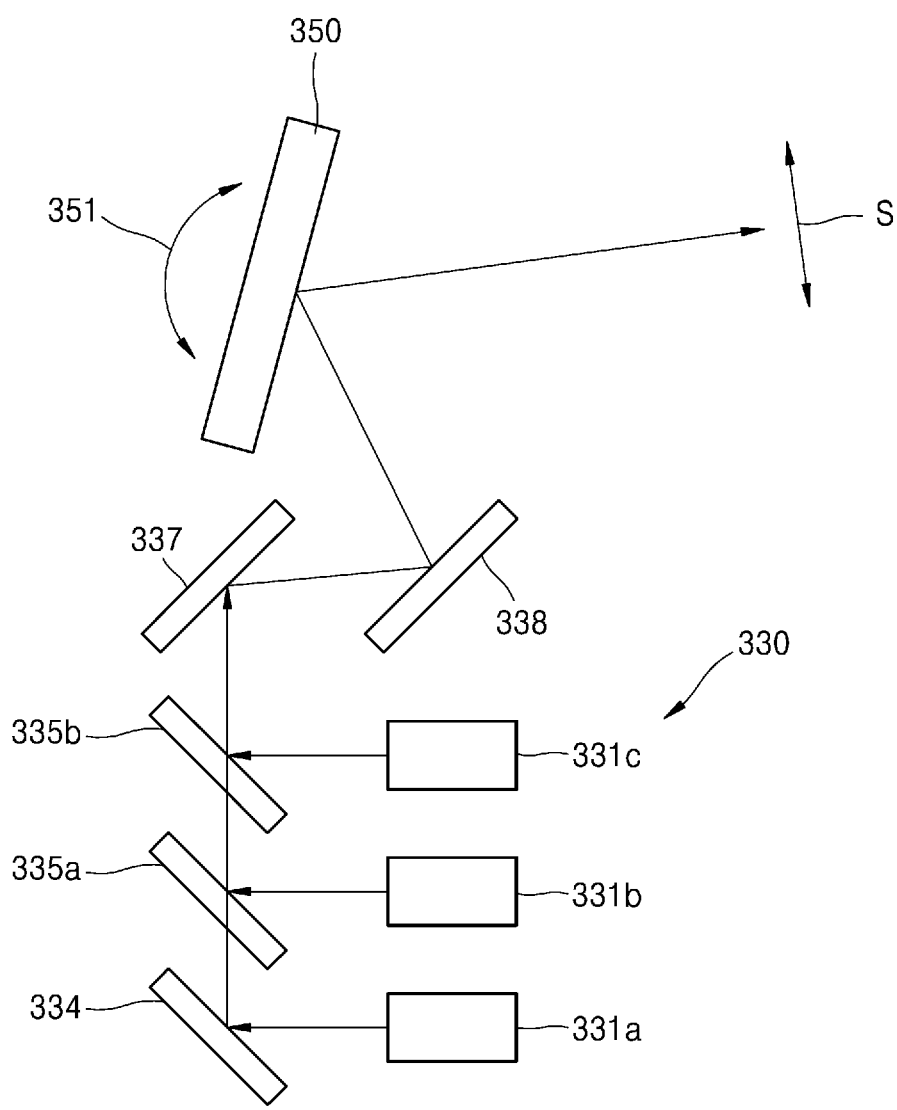
FIG. 12 is a diagram illustrating an optical engine according to another embodiment of the disclosure.

FIG. 12 is a diagram illustrating an optical engine according to another embodiment of the disclosure.

Referring to FIG. 12, the optical engine of the present embodiment of the disclosure may include an illumination optical system 330 and a scanning mirror 350.

The illumination optical system 330 of an embodiment of the disclosure may include first to third light sources 331a, 331b, and 331c. The first to third light sources 331a, 331b, and 331c may respectively include a laser light source. For example, the first to third light sources 331a, 331b, and 331c may respectively include a red laser diode (LD), a green LD, and a blue LD. The illumination optical system 330 may further include a diffuser or any other known speckle reducing member to reduce the speckle caused by the coherence of laser light.

The illumination optical system 330 of an embodiment of the disclosure may further include at least one of a collimating lens, a flyeye lens, or a relay lens. Some of the collimating lens, the flyeye lens, and the relay lens may be omitted or may be functionally combined to be implemented as one optical member.

The first to third laser beams output from the first to third light sources 331a, 331b, and 331c may be coupled into a single light path by first and second light couplers 335a and 335b. That is, the first laser beam output from the first light source 331a and the second laser beam output from the second light source 331b may be coupled into a single light path by the first light coupler 335a, and the first and the second laser beams and the third laser beam output from the third light source 331c may be coupled into a single light path by the second light coupler 335b. The first and second light couplers 335a and 335b may respectively include a dichroic mirror.

A first light path changer 334 may bend the light path of the first laser beam to align the first light source 331a with the second and third light sources 331b and 331c. The first to third laser beams coupled into a single light path by the second light coupler 335b may be incident on the scanning mirror 350 through second and third light path changers 337 and 338. The first to third light path changers 334, 337, 338 may respectively include a mirror or a total reflection prism.

Due to the second and third light path changers 337 and 338, the first to third light sources 331a, 331b, and 331c may be located to protrude more than the scanning mirror 350 based on the projection direction of the light scanned by the scanning mirror 350 and thus may be arranged at an outer side farthest from the wearer's skin, thus improving the wearer's wearing feeling. Also, the first to third light path changers 334, 337, and 338 may bend the path of the light output by the illumination optical system 330 and thus the overall length of the optical engine may be minimized.

The scanning mirror 350 may include a two-dimensional scanner. The two-dimensional scanner may include a two-axis driving scanner in which a mirror rotates (351) in two axes or may include a combination of two single-axis driving scanners. The scanning mirror 350 may include a Micro Electro Mechanical Systems (MEMS) scanner. The image forming and projecting unit described with regard to FIG. 5 may include the scanning mirror 350.

The illumination optical system 330 may modulate light according to an image signal, and the scanning mirror 350 may scan (S) a laser beam to project a two-dimensional image in the first region 172 of the waveguide 170 (see FIG. 4).

The optical engine of the present embodiment of the disclosure may implement color images sequentially. That is, the first to third light sources 331a, 331b, and 331c may be sequentially driven to sequentially output first to third monochromatic laser beams, and the scanning mirror 350 may scan the first to third monochromatic laser beams onto the first region 172 of the waveguide 170 in synchronization with the first to third light sources 331a, 331b, and 331c sequentially driven, thereby implementing a color image.

An imaging lens (not illustrated) may be further arranged between the scanning mirror 350 and the waveguide 170 to allow the scanned laser beam to be imaged.

In the present embodiment of the disclosure, a case in which the scanning mirror 350 includes a two-dimensional scanner has been described as an example; however, the disclosure is not limited thereto. The scanning mirror 350 may include a one-dimensional scanner in which a mirror rotates in one axis. In this case, the optical engine may further include a linear light modulator for forming a line-shaped image, and the scanning mirror 350 may scan the line-shaped image in a perpendicular direction of the line shape. For example, any one of the second light path changer 337 or the third light path changer 338 may be replaced with a linear light modulator.

In the present embodiment of the disclosure, the first to third light sources 331a, 331b, and 331c of the illumination optical system 330 are illustrated as being arranged in a line under the scanning mirror 350 due to the second and third light path changers 337 and 338; however, the disclosure is not limited to thereto.

Figure 13:
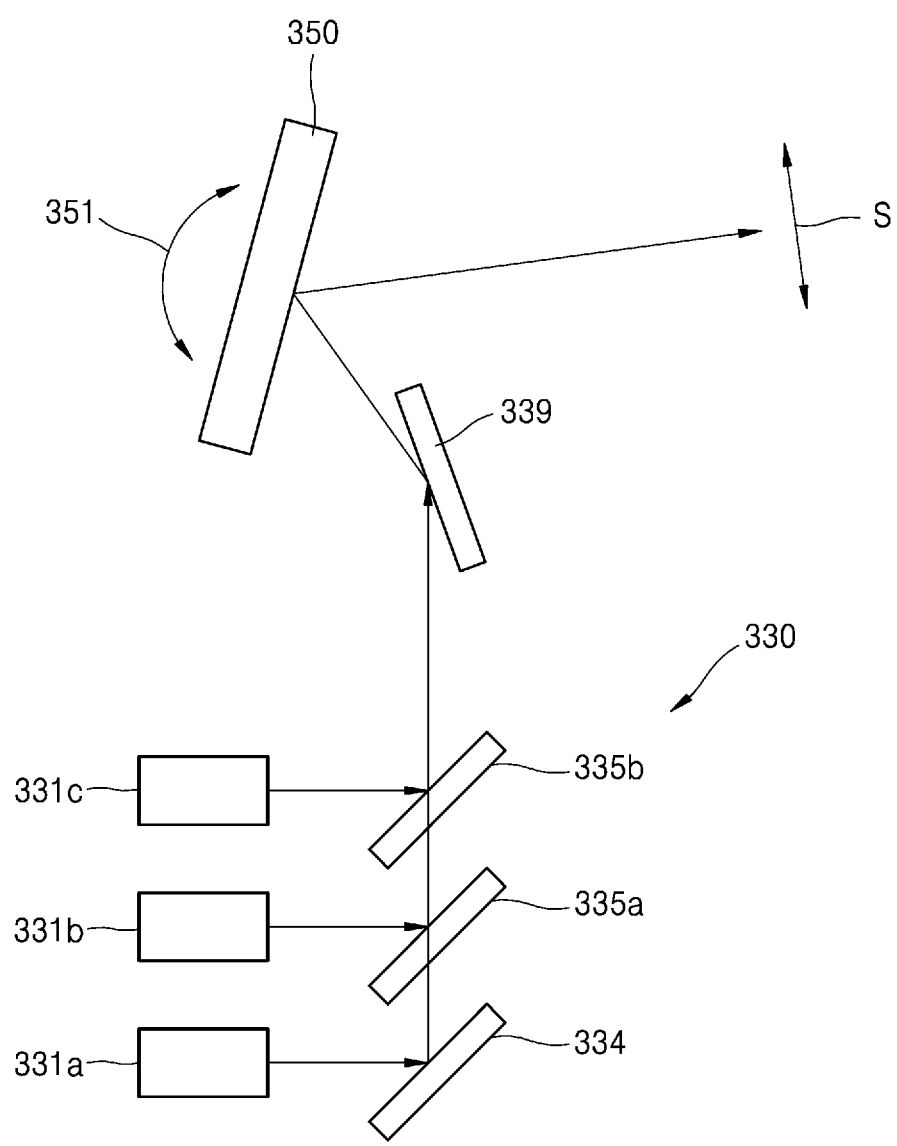
FIG. 13 is a diagram illustrating an optical engine according to another embodiment of the disclosure.

FIG. 13 is a diagram illustrating an optical engine according to another embodiment of the disclosure. Referring to FIG. 13, an illumination optical system 330 may be located under a scanning mirror 350 due to a second light path changer 339. In the present embodiment of the disclosure, a first light path changer 334 or first and second light couplers 335a and 335b located in the illumination optical system 330 may be located to protrude in the projection direction of the light scanned by the scanning mirror 350.

Figure 14:
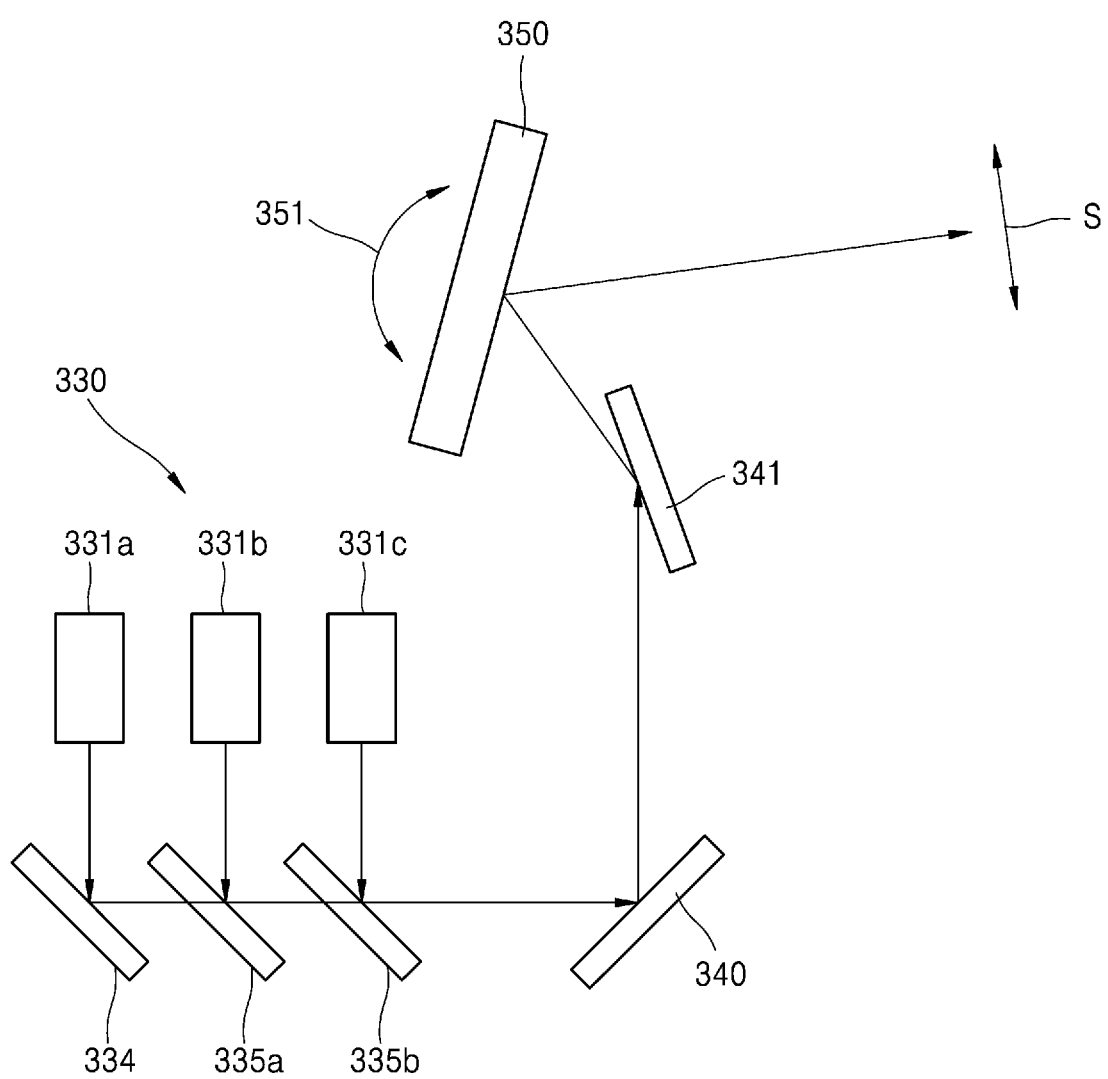
FIG. 14 is a diagram illustrating an optical engine according to another embodiment of the disclosure.

FIG. 14 is a diagram illustrating an optical engine according to another embodiment of the disclosure. Referring to FIG. 14, an illumination optical system 330 may be located under a scanning mirror 350 due to second and third light path changers 340 and 341.

Figure 15:
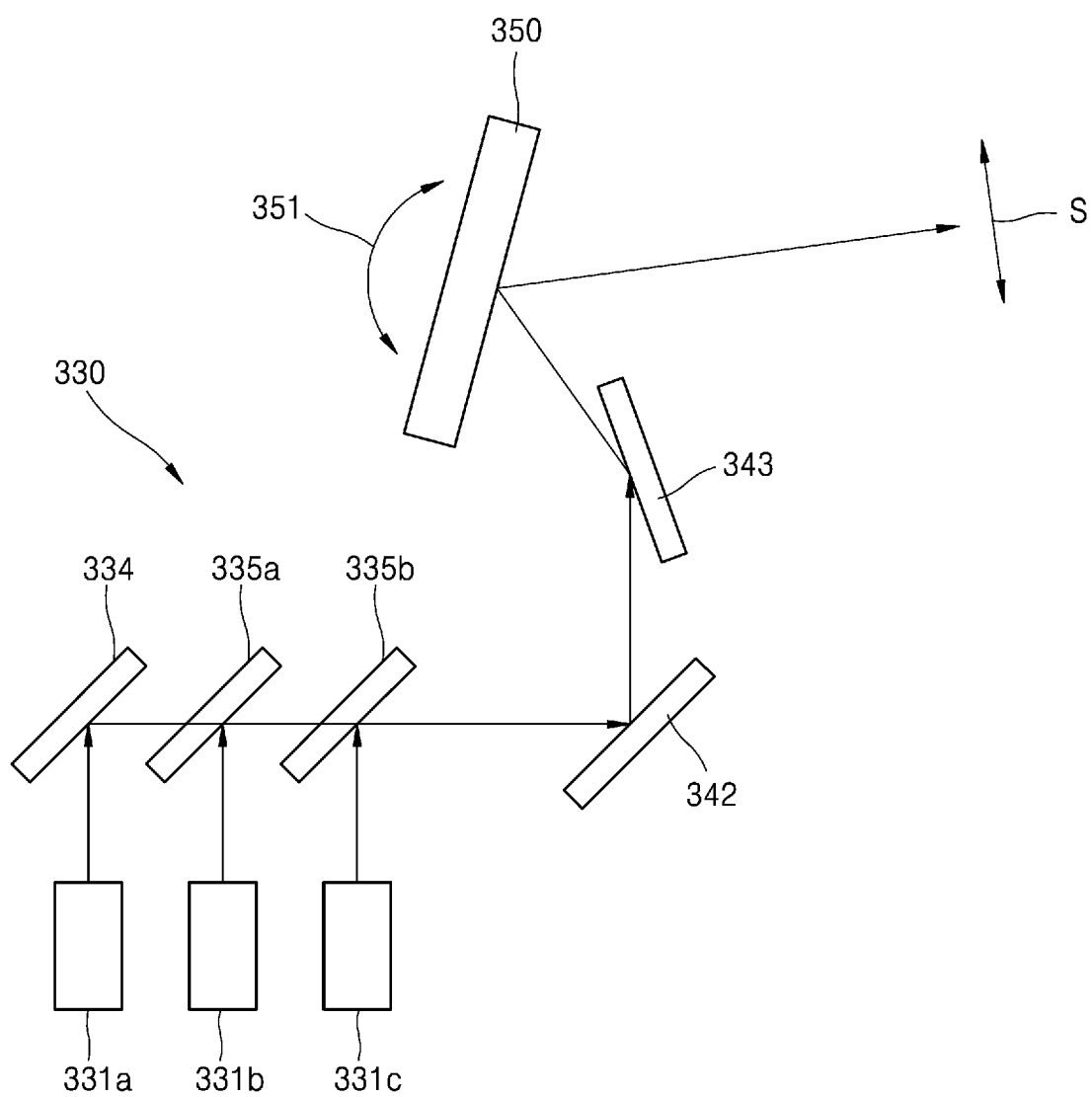
FIG. 15 is a diagram illustrating an optical engine according to another embodiment of the disclosure.

FIG. 15 is a diagram illustrating an optical engine according to another embodiment of the disclosure. Referring to FIG. 15, an illumination optical system 330 may be located under a scanning mirror 350 due to second and third light path changers 342 and 343.

In the above embodiments of the disclosure, in the waveguide 170, the second region 173 is located in the first direction (X direction) with respect to the first region 172 and the third region 174 is located in the second direction (Y direction) with respect to the second region 173; however, the disclosure is not limited thereto.

Figure 16:
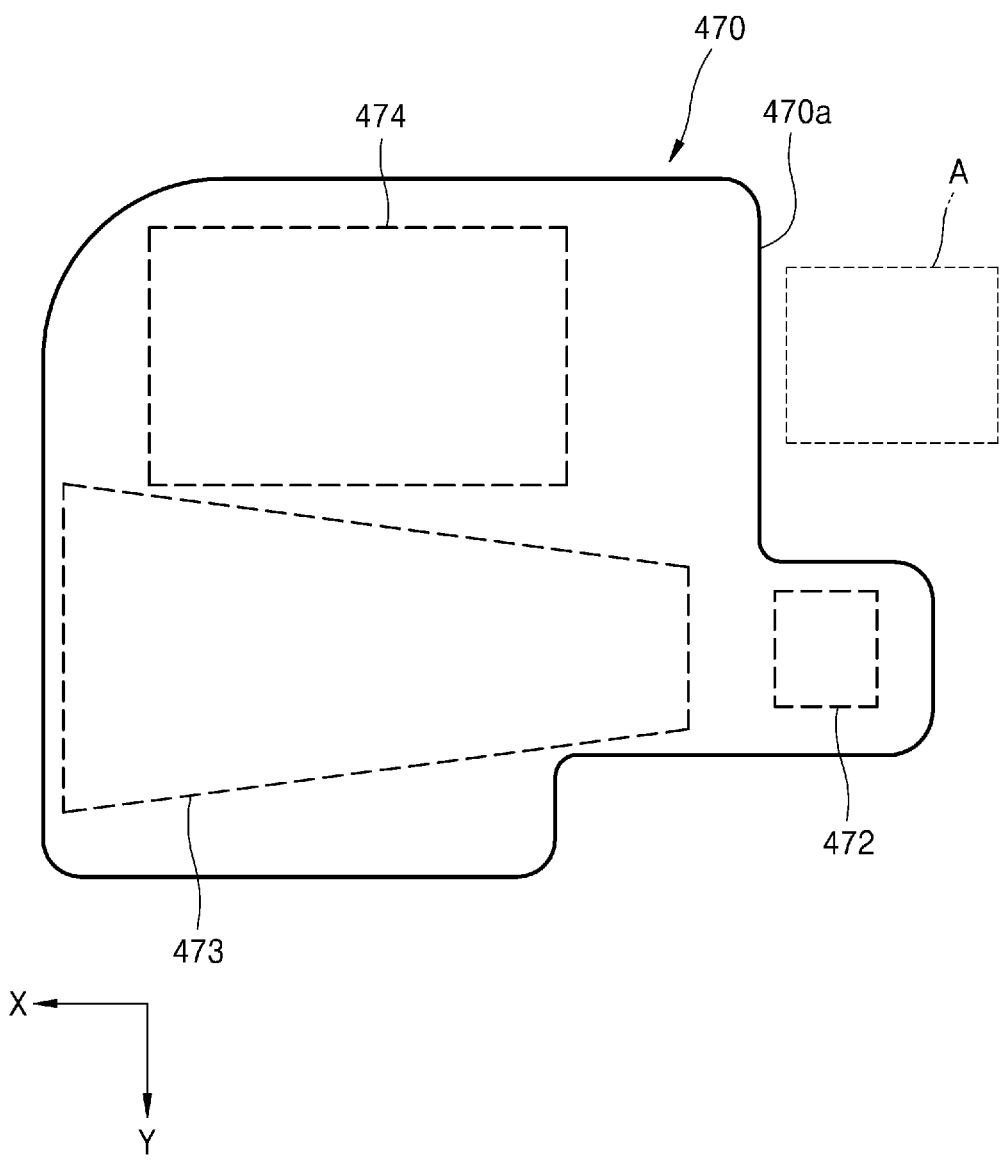
FIG. 16 is a diagram illustrating an arrangement of an optical engine according to a waveguide according to another embodiment of the disclosure.

FIG. 16 is a diagram illustrating an arrangement of an optical engine according to a waveguide 470 according to another embodiment of the disclosure. As illustrated in FIG. 16, in the waveguide 470, a second region 473 may be located in the first direction (X direction) with respect to a first region 472, and a third region 474 may be located in the second direction (−Y direction) with respect to the second region 473. In the waveguide 470, with respect to the first region 472, a region A in the second direction (−Y direction) may be a region that is not used in the waveguide 470 and the waveguide 470 may have a shape 470*a* in which the region A is removed. A protruding portion (e.g., 121*a* of FIG. 3) of the optical engine may be located in the region A.

Figure 17:
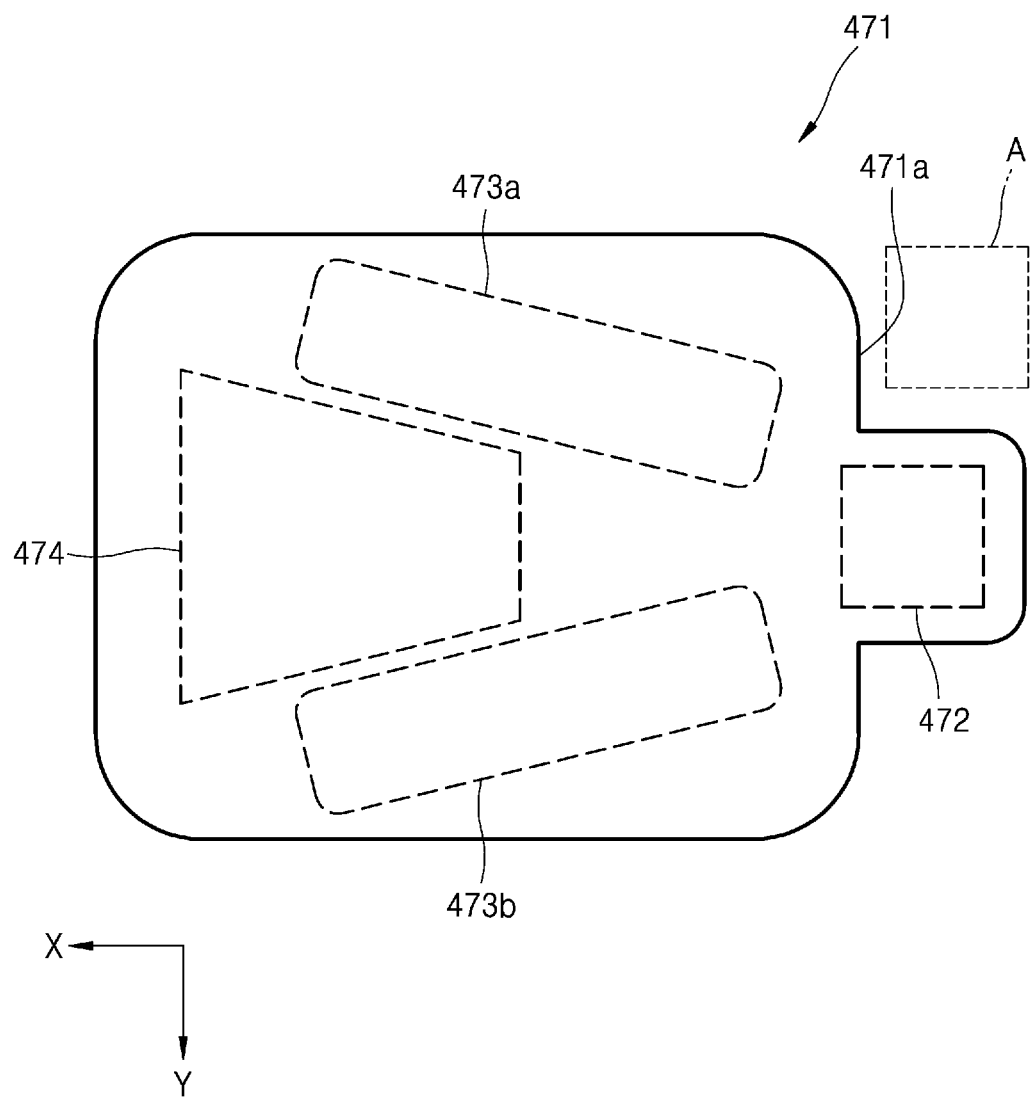
FIG. 17 is a diagram illustrating an arrangement of an optical engine according to a waveguide according to another embodiment of the disclosure.

FIG. 17 is a diagram illustrating an arrangement of an optical engine according to a waveguide 471 according to another embodiment of the disclosure. As illustrated in FIG. 17, in the waveguide 471, two second regions 473*a* and 473*b* may be located in the first direction (the direction inclined clockwise with respect to the X direction) with respect to a first region 472 and in the second direction (the direction inclined counterclockwise with respect to the X direction), and a third region 474 may be located in a region between the two second regions 473*a* and 473*b*. In the waveguide 471, with respect to the first region 472, a region A in the second direction (−Y direction) or a region in the opposite direction (+Y direction) may be a region that is not used in the waveguide 471 and the waveguide 471 may have a shape 471*a* in which the above regions are removed. A protruding portion (e.g., 121*a* of FIG. 3) of the optical engine may be located in the region A.

Figure 18:
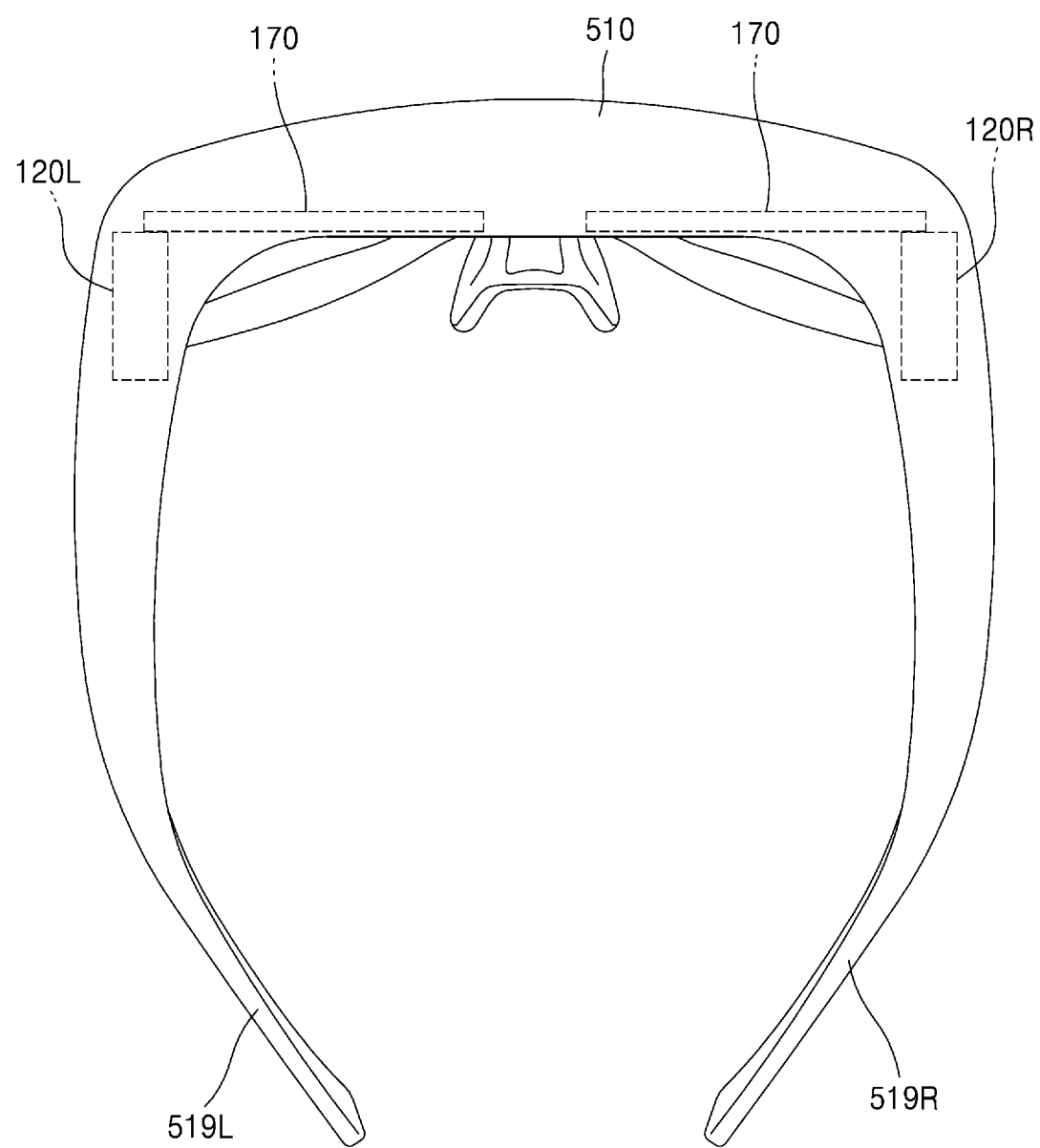
FIG. 18 is a plan view of a glasses-type display apparatus according to another embodiment of the disclosure.

In the embodiments described with reference to FIGS. 1 and 2, the temples 190 are connected to the frame 110 by the hinges 115; however, the disclosure is not limited thereto. FIG. 18 is a plan view of a glasses-type display apparatus according to another embodiment of the disclosure. Referring to FIG. 18, in the glasses-type display apparatus of the present embodiment of the disclosure, temples 519L, 519R may be integrally connected to a frame 510. The temples 519L, 519R and the frame 510 may be formed of the same material. Even when the temples 519L, 519R and the frame 510 are formed of the same material, the temples 519L, 519R may have a thin and long shape to have certain flexibility to be able to be worn by the user and the frame 510 may be thickened to have certain rigidity. Alternatively, the temples 519L, 519R and the frame 510 may be continuously formed of different materials having different flexibility (rigidity).

In the above embodiments of the disclosure, the glasses-type display apparatus has been described as an example; however, those of ordinary skill in the art will readily understand that the arrangement structure of the waveguide and the optical engine may also be similarly applied to a wearable display apparatus such as a head mounted display apparatus that is worn on the user's head to display adjacent to the user's eyes.

In the above embodiment of the disclosure, a case where both the left-eye and right-eye images are displayed is described as an example; however, the glasses-type display apparatus (e.g., wearable display apparatus) may include only the left-eye waveguide 170L and the left-eye optical engine 120L or may include only the waveguide 170R and the right-eye optical engine 120R.

According to the disclosure, the mechanical stability of the glasses-type display apparatus (e.g., wearable display apparatus) may be improved by preventing or suppressing the misalignment between the waveguide and the projector (e.g., optical engine) caused by the bending of the temples or the like when the glasses-type display apparatus (e.g., wearable display apparatus) is worn.

According to the disclosure, the alignment of the waveguide and the projector may be facilitated when assembling or repairing the glasses-type display apparatus (e.g., wearable display apparatus).

According to the disclosure, the limitation of the external shape of the glasses-type display apparatus (e.g., wearable display apparatus) may be reduced by arranging the optical engine at the frame end portion of the glasses-type body.

According to the disclosure, components having a high heat value among the components of the glasses-type display apparatus (e.g., wearable display apparatus) may be arranged at an outer side far from the wearer's skin.

For better understanding of the disclosure, the glasses-type display apparatuses (e.g., wearable display apparatuses) have been described above with reference to the embodiments illustrated in the drawings; however, this is merely an example and those of ordinary skill in the art will understand that various modifications and other equivalent embodiments are possible therefrom. Thus, the scope of the disclosure should be defined by the appended claims.

What is claimed is:

1. A glasses-type display apparatus comprising:
   an optical engine configured to project light containing an image;
   a waveguide for receiving the projected light and outputting at least a portion of the received light; and
   a glasses-type body for holding the waveguide and the optical engine,
   wherein a portion of the optical engine is arranged at a side portion of the waveguide,
   wherein the waveguide includes:
   a first region facing the optical engine and configured to receive the light from the optical engine and transmit the received light in a first direction,
   a second region located in the first direction with respect to the first region and configured to transmit the light received from the first region in a second direction different from the first direction, and
   a third region located in the second direction with respect to the second region and configured to output the light received from the second region in a third direction different from each of the first direction and the second direction, and
   wherein the glasses-type body includes a frame and a temple connected to an end portion of the frame and extending in one direction,
   the waveguide is held by the frame, and
   the optical engine is installed in the end portion of the frame.

2. The glasses-type display apparatus of claim 1, wherein the frame and the temple are connected to each other by hinges.

3. The glasses-type display apparatus of claim 1, wherein the frame and the temple are continuously connected to each other.

4. The glasses-type display apparatus of claim 1, wherein the optical engine includes a housing for mounting optical components,
   the housing is fixed to the glasses-type body by a fixing member, and the fixing member adjusts a projection position in the optical engine.

5. The glasses-type display apparatus of claim 4, wherein the fixing member adjustably fixes at least two points of the housing such that an optical axis direction of the light projected from the optical engine is tiltable.

6. The glasses-type display apparatus of claim 4, wherein the fixing member includes a screw or a bolt.

7. The glasses-type display apparatus of claim 1, wherein the optical engine includes an illumination optical system configured to output light, an image forming and projecting unit configured to receive the light from the illumination optical system, form an image, and project light of the image onto the waveguide, and at least one light path changer for changing a light path in the optical engine, and the at least one light path changer is further configured such that a portion of the illumination optical system protrudes more than the image forming and projecting unit based on a light projection direction of the image forming and projecting unit.

8. The glasses-type display apparatus of claim 7, wherein the image forming and projecting unit includes an image panel configured to receive the light from the illumination optical system to form an image and a projection optical system configured to project the image formed by the image panel onto the waveguide.

9. The glasses-type display apparatus of claim 7, wherein the image forming and projecting unit includes a light scanning unit configured to scan the light from the illumination optical system to the waveguide to form an image.

10. A glasses-type display apparatus comprising:
a waveguide for receiving a projected light and for outputting at least a portion of the received light;
an optical engine configured to project light containing an image onto the waveguide; and
a glasses-type body for holding the waveguide and the optical engine,
wherein the optical engine includes an illumination optical system configured to output light, an image forming and projecting unit configured to receive the light from the illumination optical system, form an image, and project the image onto the waveguide, and at least one light path changer for changing a light path in the optical engine,
wherein the at least one light path changer is further configured such that a portion of the illumination optical system is arranged at a side portion of the waveguide,
wherein the waveguide includes:
a first region facing the optical engine and configured to receive the light from the optical engine and transmit the received light in a first direction,
a second region located in the first direction with respect to the first region and configured to transmit the light received from the first region in a second direction different from the first direction, and
a third region located in the second direction with respect to the second region and configured to output the light received from the second region in a third direction different from each of the first direction and the second direction, and
wherein the glasses-type body includes a frame and a temple connected to an end portion of the frame and extending in one direction,
the waveguide is held by the frame, and
the optical engine is installed in the end portion of the frame.

11. The glasses-type display apparatus of claim 10, wherein the image forming and projecting unit includes an image panel configured to receive the light from the illumination optical system to form an image and a projection optical system configured to project light of the image formed by the image panel onto the waveguide, and
the portion of the illumination optical system protrudes more than an output surface of the projection optical system based on an optical axis direction of the projection optical system.

12. The glasses-type display apparatus of claim 11, wherein the image panel includes a reflective image panel,
the image forming and projecting unit further includes a deflector arranged on a light path between the reflective image panel and the projection optical system, and
the deflector for reflecting the light output by the illumination optical system to the image panel and transmit the light of the image reflected by the image panel to the projection optical system.

13. The glasses-type display apparatus of claim 10, wherein the image forming and projecting unit includes a scanning mirror configured to scan the light from the illumination optical system onto the waveguide to form an image.

14. The glasses-type display apparatus of claim 10, wherein the illumination optical system includes at least one light source including a light emitting diode (LED), a laser diode (LD), an organic light emitting diode (OLED), or a lamp.

15. The glasses-type display apparatus of claim 10, wherein the light path changer includes a reflection mirror or a total reflection prism.

16. The glasses-type display apparatus of claim 10, wherein the illumination optical system includes a first light source configured to output first monochromatic light, a second light source configured to output second monochromatic light, a third light source configured to output third monochromatic light, and a light combiner for combining the first monochromatic light, the second monochromatic light, and the third monochromatic light into a single light path,
colors of the first monochromatic light, the second monochromatic light, and the third monochromatic light are different from each other, and
the portion of the illumination optical system includes at least one of the first light source, the second light source, or the third light source.

17. The glasses-type display apparatus of claim 10, wherein the first region faces the image forming and projecting unit to receive an input of an image, and
the portion of the illumination optical system is located adjacent to the first region of the waveguide.

18. The glasses-type display apparatus of claim 10, wherein the waveguide includes a front surface and a rear surface opposite to the front surface, and
the portion of the illumination optical system is located in front of the rear surface of the waveguide based on a thickness direction of the waveguide.

19. A glasses-type display apparatus comprising:
an optical engine configured to project light containing an image; and
a waveguide including a front surface and a rear surface opposite to the front surface and for receiving the projected light at the rear surface and reflect at least a portion of the received light between the front surface and the rear surface to be output to the rear surface, wherein a portion of the optical engine is located in front of the rear surface of the waveguide based on a thickness direction of the waveguide, wherein the waveguide includes:

a first region facing the optical engine and configured to receive the light from the optical engine and transmit the received light in a first direction, a second region located in the first direction with respect to the first region and configured to transmit the light received from the first region in a second direction different from the first direction, and a third region located in the second direction with respect to the second region and configured to output the light received from the second region in a third direction different from each of the first direction and the second direction, and wherein the rear surface of the waveguide faces an eye of a user.

\* \* \* \* \*